United States Patent
Kuzmin et al.

(10) Patent No.: US 8,289,023 B2
(45) Date of Patent: Oct. 16, 2012

(54) GEOPHYSICAL PROSPECTING USING ROTATIONALLY INVARIANT PARAMETERS OF NATURAL ELECTROMAGNETIC FIELDS

(75) Inventors: Petr Valentinovich Kuzmin, Aurora (CA); Gene Borel, Aurora (CA); Edward Morrison, King City (CA); Jack Dodds, Aurora (CA)

(73) Assignee: Geotech Airborne Limited, St. Michael (BB)

( * ) Notice: Subject to any disclaimer, the term of this patent is extended or adjusted under 35 U.S.C. 154(b) by 340 days.

(21) Appl. No.: 12/645,915

(22) Filed: Dec. 23, 2009
(Under 37 CFR 1.47)

(65) Prior Publication Data

US 2010/0244843 A1    Sep. 30, 2010

Related U.S. Application Data

(60) Provisional application No. 61/140,337, filed on Dec. 23, 2008, provisional application No. 61/154,024, filed on Feb. 20, 2009, provisional application No. 61/264,687, filed on Nov. 26, 2009.

(51) Int. Cl.
*G01V 3/08* (2006.01)
(52) U.S. Cl. .............................................. 324/345
(58) Field of Classification Search .................. None
See application file for complete search history.

(56) References Cited

U.S. PATENT DOCUMENTS

| | | | |
|---|---|---|---|
| 4,628,266 A | 12/1986 | Dzwinel | |
| 5,770,945 A * | 6/1998 | Constable | 324/350 |
| 2002/0092350 A1 | 7/2002 | Etkin et al. | |
| 2003/0169045 A1 | 9/2003 | Whitton | |
| 2004/0160223 A1 | 8/2004 | McElhinney | |
| 2005/0001622 A1* | 1/2005 | Morrison et al. | 324/330 |
| 2008/0246484 A1 | 10/2008 | Miles et al. | |
| 2009/0243613 A1* | 10/2009 | Lu et al. | 324/323 |
| 2010/0026304 A1* | 2/2010 | Duncan | 324/345 |

OTHER PUBLICATIONS

International Search Report and Written Opinion from corresponding family case, PCT/CA2009/001863; dated Mar. 26, 2010.
International Search Report and Written Opinion from corresponding family case, PCT/CA2009/001865; dated Mar. 29, 2010.

* cited by examiner

*Primary Examiner* — Paresh Patel
(74) *Attorney, Agent, or Firm* — Novak Druce + Quigg LLP

(57) ABSTRACT

A geophysical survey method and system that comprises: measuring along multiple axes at multiple locations within a survey area magnetic field components of a low frequency magnetic field resulting from naturally occurring electromagnetic sources using a first sensor system; measuring along multiple axes magnetic field components of a low frequency magnetic field resulting from naturally occurring electromagnetic sources using a second sensor system; and receiving information about the magnetic field components measured by the first sensor system and the second sensor system and in dependence thereon computing parameters from the received information that are independent of rotation of the first sensor system or the second sensor system about any axis thereof.

15 Claims, 22 Drawing Sheets

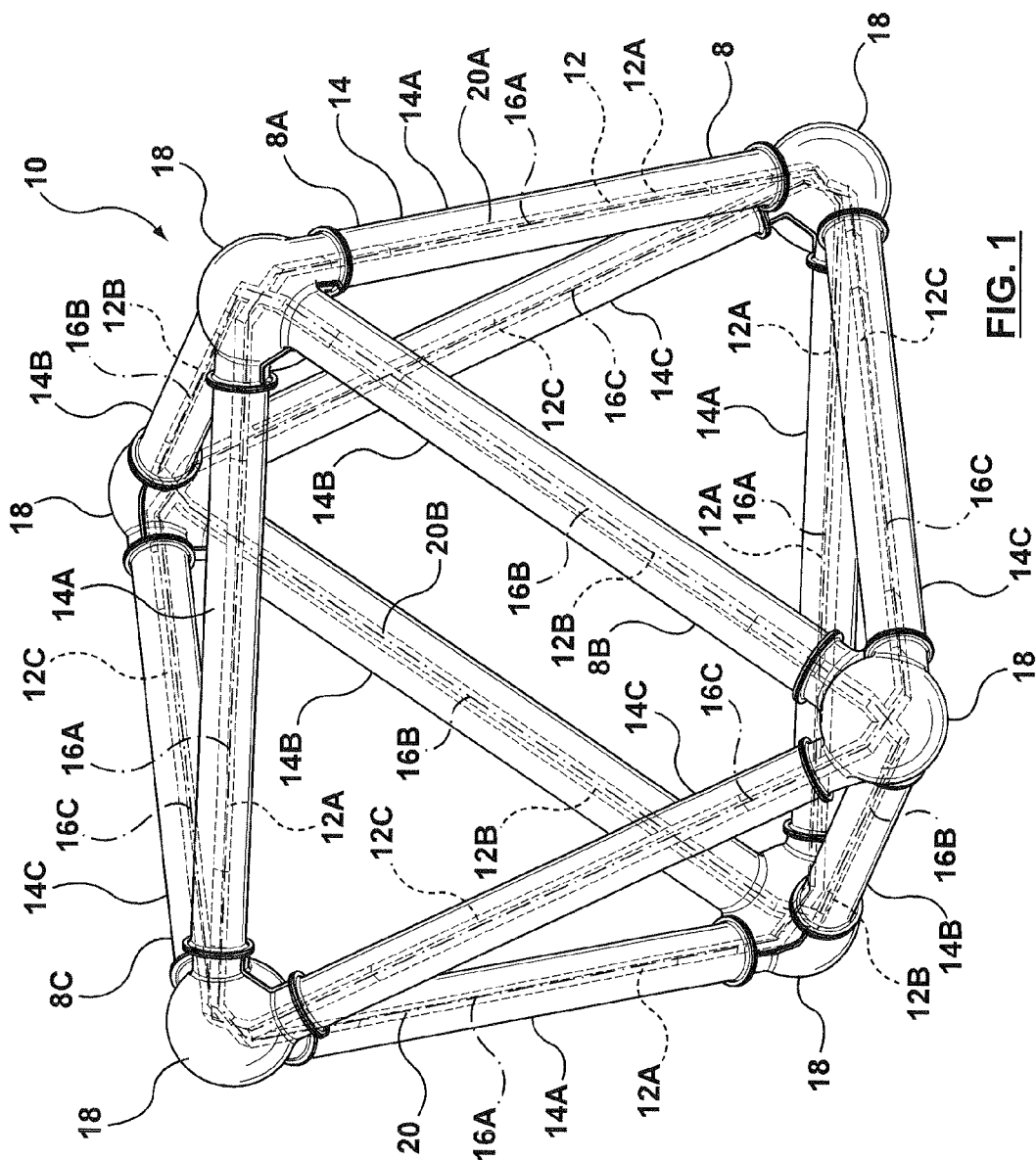

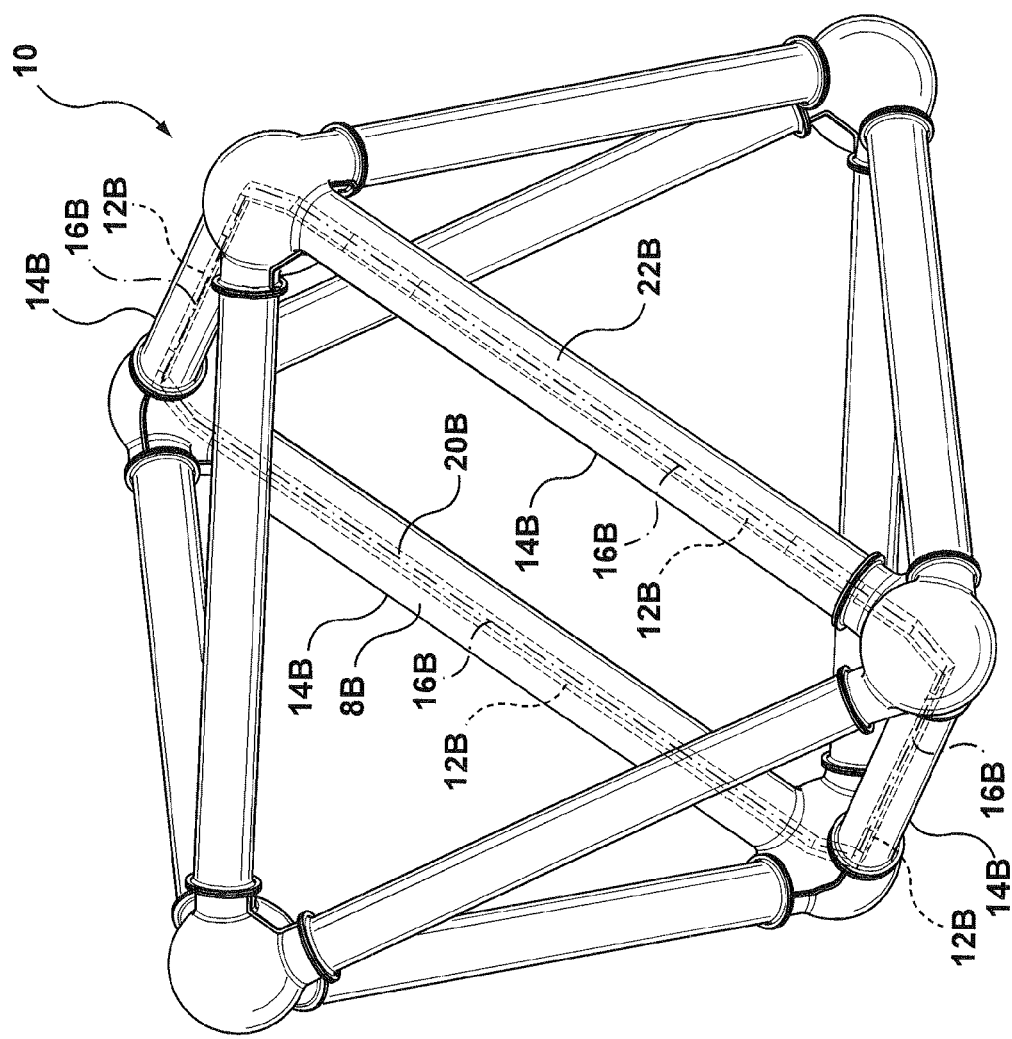

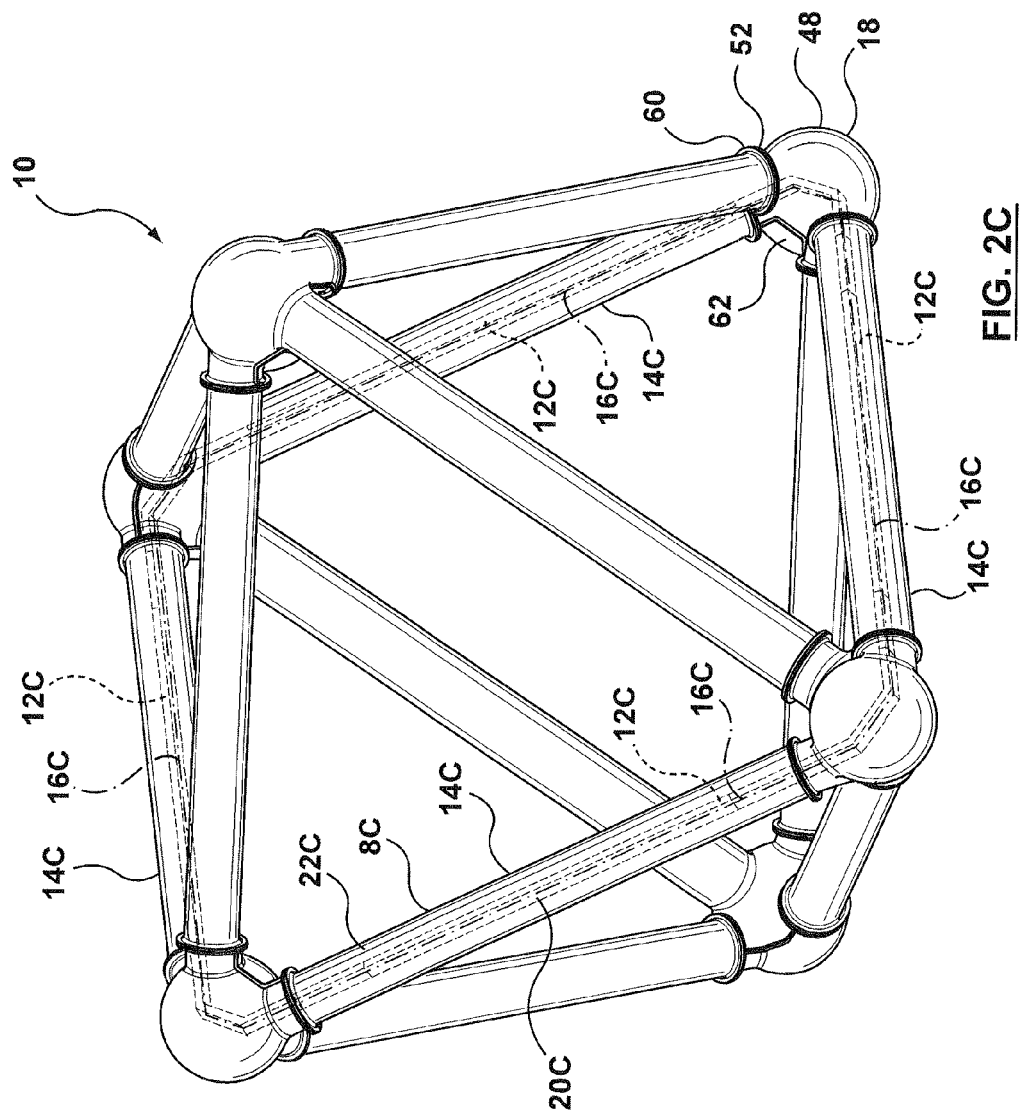

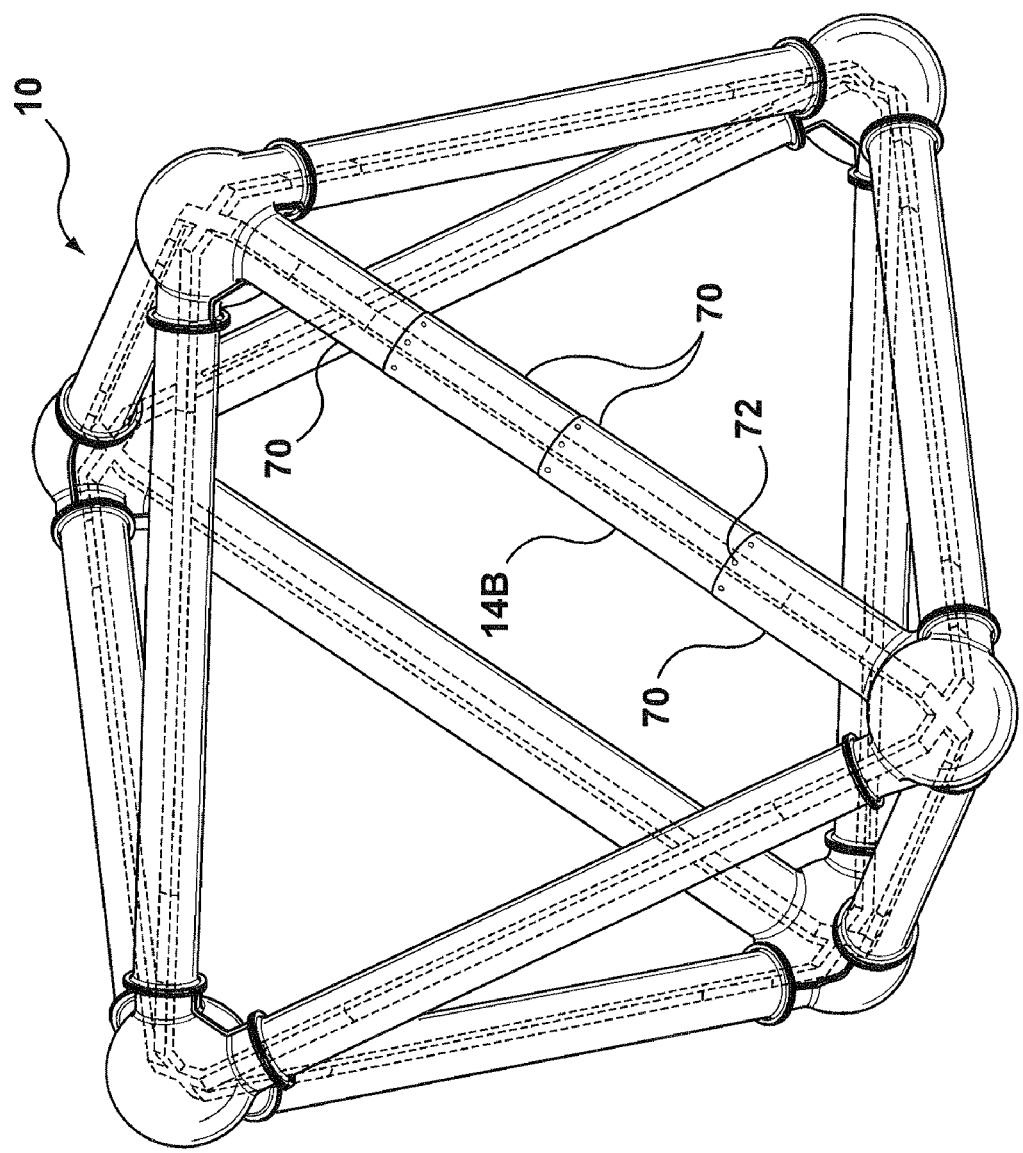

GEOPHYSICAL PROSPECTING USING ROTATIONALLY INVARIANT PARAMETERS OF NATURAL ELECTROMAGNETIC FIELDS

This application claims the benefit of and priority to: U.S. provisional patent application Ser. No. 61/140,337 filed Dec. 23, 2008; U.S. provisional patent application Ser. No. 61/154,024 filed Feb. 20, 2009; and U.S. provisional patent application No. 61/264,687 filed Nov. 26, 2009, the contents of which are incorporated herein by reference.

FIELD

This description relates to a multiple receiver coil system and apparatus for geophysical surveying using natural electromagnetic fields.

BACKGROUND OF THE INVENTION

Geophysical electromagnetic ("EM") prospecting techniques can be effective in determining the electrical conductivity of soils, rocks, and other bodies at and under the earth's surface.

Geophysical EM prospecting can be carried out using surface based equipment and airborne equipment. Airborne methods in which equipment is transported by aircraft such as helicopter, airplane or airship may be useful for large area surveys. For airborne electromagnetic ("AEM") systems, survey data may be acquired while an airplane or helicopter flies at a nearly constant speed along nearly-parallel and close to equally-spaced lines at an approximately constant height above ground. In some applications, geophysical EM prospecting of a seabed may be carried out using equipment located under the surface of a body of water.

Some geophysical surveying methods are active in that the equipment is used to transmit a signal to a targeted area, and then measure a response to the transmitted signal. Other geophysical surveying methods are passive in that signals produced from a target area are measured without first transmitting a signal to the target area.

An example of a passive geophysical EM prospecting method is Audio Frequency Magnetic ("AFMAG") surveying in which the EM fields resulting from naturally occurring primary signal sources such as lightning discharges are measured. These EM fields propagate around the earth as plane waves guided by the ionosphere and earth's surface. Lightning activity occurring remote from the measurement point can produce signals with a nearly flat spectral density at frequencies between, for example, 8 Hz and 500 Hz, varying with geographical location, time of the day, seasons and weather conditions. An example of a passive AFMAG geophysical EM prospecting method is shown in U.S. Pat. No. 6,876,202.

Examples of active geophysical EM prospecting methods include methods in which a transmitter is used to illuminate a target area with a primary field and a receiver is used to measure the secondary field generated by the target area. Such systems are often frequency domain or time domain systems. In at least some frequency-domain electromagnetic ("FDEM") systems, a transmitter coil continuously transmits an electromagnetic signal at fixed multiple frequencies, while the receiver coil measures the secondary field signals continuously over time.

SUMMARY

According to one example embodiment is a geophysical survey system comprising: a first sensor system including multiple magnetic field sensors for measuring magnetic field components of a low frequency magnetic field resulting from naturally occurring electromagnetic sources, the magnetic sensors of the first sensor system measuring magnetic field components representing three axes which are substantially perpendicular to each other; a second sensor system spaced apart from the first sensor system and including multiple magnetic field sensors for measuring magnetic field components of a low frequency magnetic field resulting from naturally occurring electromagnetic sources, the magnetic sensors of the second sensor system measuring magnetic field components representing three axes which are substantially perpendicular to each other; and a processing system for receiving information about the magnetic field components measured by the first sensor system and the second sensor system and in dependence thereon estimating transfer functions at a plurality of frequencies for transforming magnetic field components measured by the second sensor system to magnetic field components measured by the first sensor system, and computing parameters from the transfer functions that are independent of rotation of the first sensor system or the second sensor system about any axis thereof.

According to another example embodiment, there is provided a geophysical survey system comprising: a first sensor system including three magnetic sensors for measuring low frequency magnetic field data in a survey area, the sensors each having a different relative orientation and measuring the magnetic field data in a different relative direction; a second sensor system spaced apart from the first sensor system and including two or three magnetic sensors for measuring low frequency magnetic field data in the survey area, the sensors of the second sensor system each having a different relative orientation and measuring the electromagnetic field data in a different relative direction; and a processing system for calculating a set of first vector values over time in dependence on the magnetic field data measured through the first sensor system and calculating a set of second vector values over time in dependence on the magnetic field data measured through the second sensor system and comparing one or more characteristics of the first vector values and the second vector values to identify geophysical information about the survey area.

According to another example embodiment there is provided a method of geophysical surveying comprising: measuring along multiple axes at multiple locations within a survey area magnetic field components of a low frequency magnetic field resulting from naturally occurring electromagnetic sources using a first sensor system; measuring along multiple axes magnetic field components of a low frequency magnetic field resulting from naturally occurring electromagnetic sources using a second sensor system; and receiving information about the magnetic field components measured by the first sensor system and the second sensor system and in dependence thereon computing parameters from the received information that are independent of rotation of the first sensor system or the second sensor system about any axis thereof.

BRIEF DESCRIPTION OF THE DRAWINGS

Example embodiments of the invention are provided in the following description. Such description makes reference to the annexed drawings wherein:

FIG. 1 is a perspective view of an example embodiment of a multiple receiver coil assembly according to one example embodiment.

FIGS. 2A, 2B and 2C are each perspective views of the receiver coil assembly of FIG. 1, each highlighting a respective one of three receiver coils of the coil assembly.

FIG. 8 is a perspective view of an alternative embodiment of a receiver coil assembly.

DESCRIPTION OF EXAMPLE EMBODIMENTS

Receiver Coil Assembly

FIG. 1 illustrates a multiple receiver coil assembly 10 for geophysical surveying, according to example embodiments of the invention. The receiver coil assembly 10 includes multiple receiver coils supported within a skeletal frame 8 that maintains the coils in a substantially fixed position relative to each other. As will be explained in greater detail below, in at least some configurations the receiver coil assembly 10 can allow a relatively low weight to coil size ratio, and in applications where the receiver coil assembly 10 is moved through a fluid such as air or water, can mitigate against drag.

The multiple receiver coil assembly 10 of FIG. 1 includes three air-core receiver coils 16A, 16B and 16C supported within the frame 8. Each of the coils 16A, 16B and 16C is wound in a respective plane and has a respective dipole axis—in at least one example embodiment, the axis of the three coils 16A, 16B and 16C intersect at a common central location, with each coil axis being substantially orthogonal to axes of the other two coils.

In an example embodiment, the skeletal frame 8 is made up of tubular members that define internal passages in which an internal frame 20 is elastically suspended, and the receiver coils 16A, 16B and 16C are secured to the internal frame 20. More particularly, in the illustrated embodiment, the skeletal frame includes three interconnecting tubular outer frame sections 8A, 8B and 8C, which are substantially identical to each other and which each contain substantially identical internal support frame sections 20A, 20B, and 20C, respectively. The internal support frame sections 20A, 20B and 20C each support a respective receiver coil 16A, 16B and 16C. The internal support frame sections 20A, 20B and 20C are interconnected to form the internal frame 20, as diagrammatically illustrated in FIG. 3. Accordingly, each of the receiver coils 16A, 16B and 16C are substantially contained within a respective independent frame section 8A, 8B and 8C.

Figure 2A:
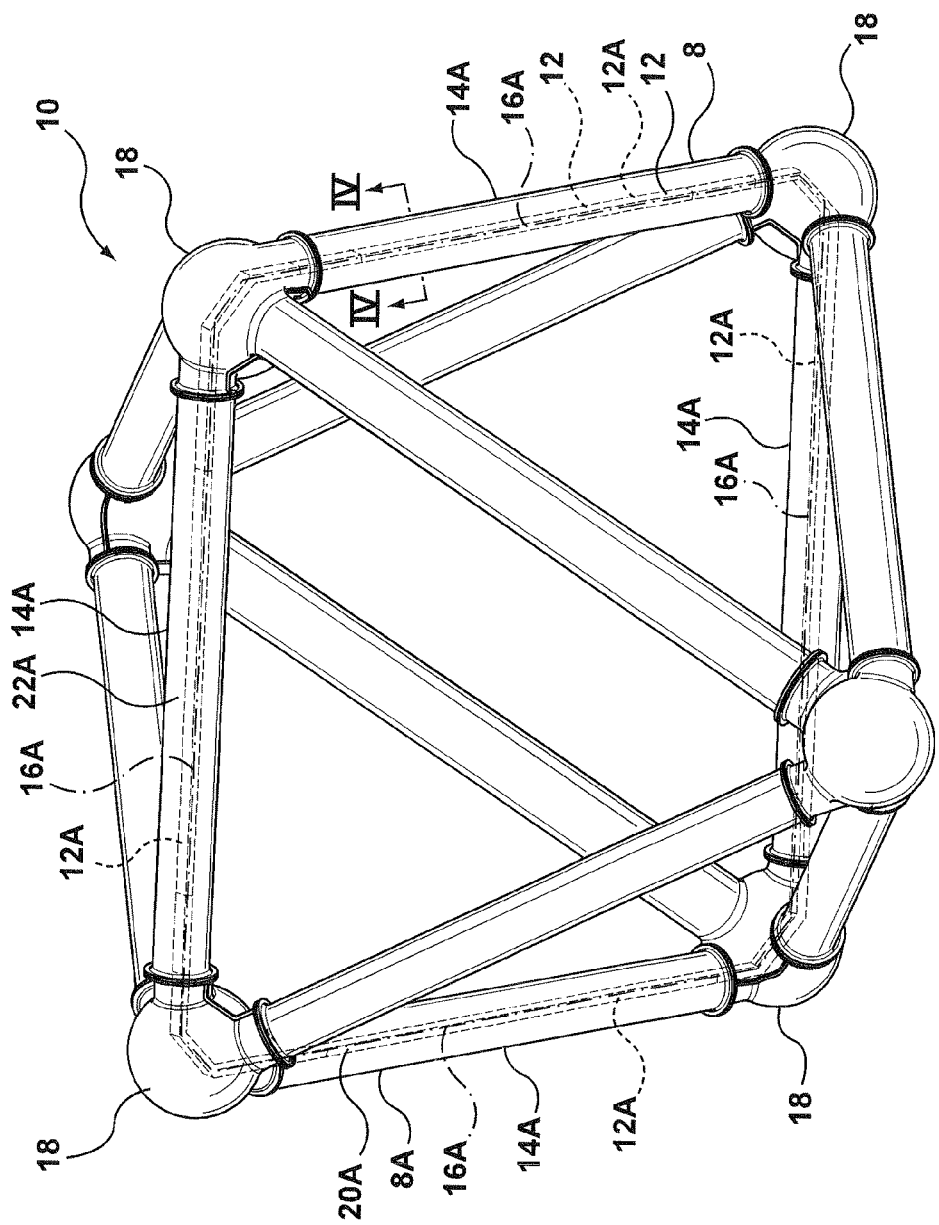
Figure 3:
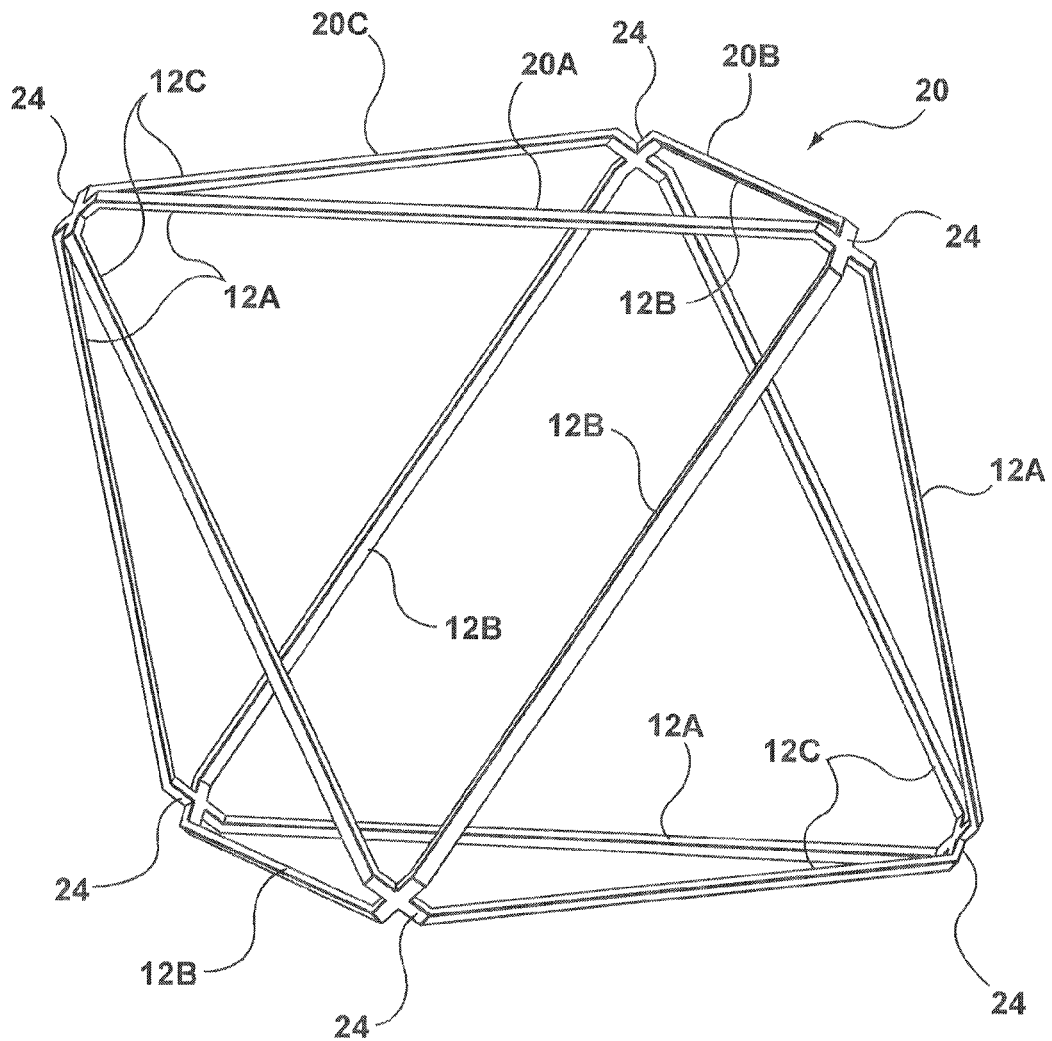
FIG. 3 is a perspective view of an internal frame of the receiver coil assembly of FIG. 1.

FIGS. 2A, 2B and 2C are provided to individually highlight the frame sections 8A, 8B and 8C, respectively. Frame sections 8A, 8B and 8C each define a respective loop housing a respective receiver coil 16A, 16B and 16C. In the presently described embodiment, frame sections 8A, 8B and 8C and internal frame sections 20A, 20B and 20C are each parallelogram shaped, and can be for example square shaped such that the skeletal frame 8 is substantially shaped like a regular octahedron. As shown in FIG. 2A, the outer frame section 8A is formed by four elongate tubular frame members 14A connected by four corner sections 18 to form square-shaped frame section 8A which defines a continuous internal passage 22A in which correspondingly square-shaped internal frame section 20A is elastically suspended. The internal frame section 20A is formed by four elongated frame members 12A connected by corner sections 24 (FIG. 3). The terms "internal" and "inner" are used interchangeably herein when referring to frame sections 20A, 20B and 20C and frame members 12A, 12B and 12C. The receiver coil 16A is secured within a trough or passage defined by the internal frame section 20A.

Similarly, as shown in FIG. 2B, the sub-frame 8B is formed by four elongate tubular frame members 14B connected by four corner sections 18 to form square-shaped frame section 8B which defines a continuous internal passage 22B in which correspondingly square-shaped internal frame section 20B is elastically suspended. The internal frame section 20B is formed by four elongated frame members 12B connected by corner sections 24. The receiver coil 16B is secured within a trough or passage defined by the internal frame section 20B. As shown in FIG. 2C, the sub-frame 8C is formed by four elongate tubular frame members 14C connected by four corner sections 18 to form square-shaped frame section 8C which defines a continuous internal passage 22C in which correspondingly square-shaped internal frame section 20C is elastically suspended. The internal frame section 20C is formed by four elongated frame members 12C connected by corner sections 24. The receiver coil 16C is secured within a trough or passage defined by the internal frame section 20C.

As can be seen in FIGS. 1-3, each of the outer frame corner sections 18 is shared by and interconnects a corner of two of the tubular frame sections 8A, 8B and 8C, and each of the inner frame corner sections 24 is shared by and interconnects a corner of two of the tubular frame sections 20A, 20B and 20C.

Figure 4:
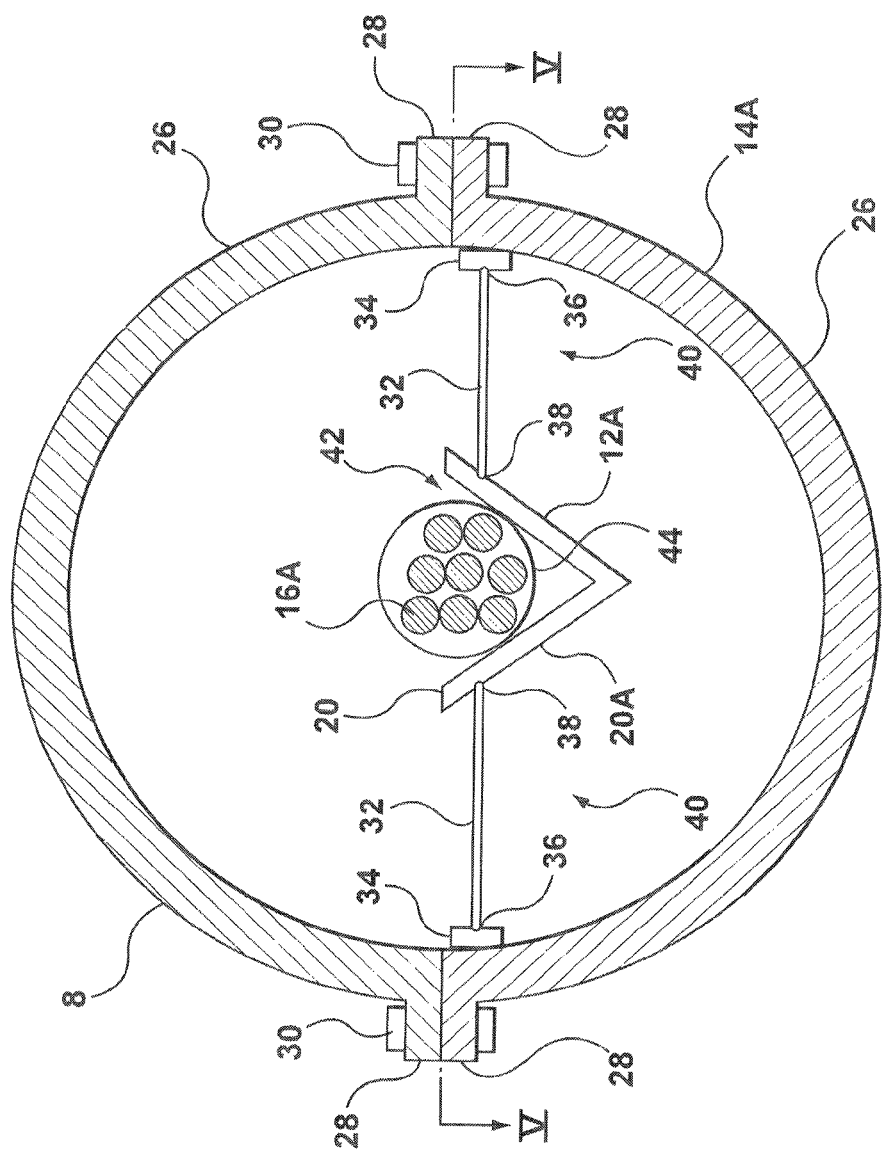
FIG. 4 is a sectional view of part of the receiver coil assembly, taken along the lines IV-IV of FIG. 2A.

In the illustrated example embodiment, the receiver coils 16B and 16C and their respective supporting inner and outer frame members 12B, 14B, 12C and 14B are constructed substantially identical to that of the receiver coil 16A and its supporting inner and outer frame members 12A, 14A, which will now be described in greater detail with reference to the sectional views shown in FIGS. 4 and 5. As can be seen in FIG. 4, in an example embodiment, each tubular frame member 14A comprises two substantially identical elongate half-cylindrical sections 26 which are secured together by mating peripheral flange portions 28 to define the internal receiver coil passage 22A. Bolts 30 or other fasteners can pass through aligned fastening holes 30 (FIG. 5) to secure the half-cylindrical sections 26 together. Half-cylindrical sections 26 may for example be formed from a light-weight rigid composite material that allows electromagnetic signals to pass through with minimal or no interference to receiver coil 16A. The inner frame member 12A is elastically suspended within the tubular frame member 14A approximately at the center of the coil passage 22A by multiple fastening assemblies 40 that are spaced internally along the length of each of the tubular frame members 14A.

Figure 5:
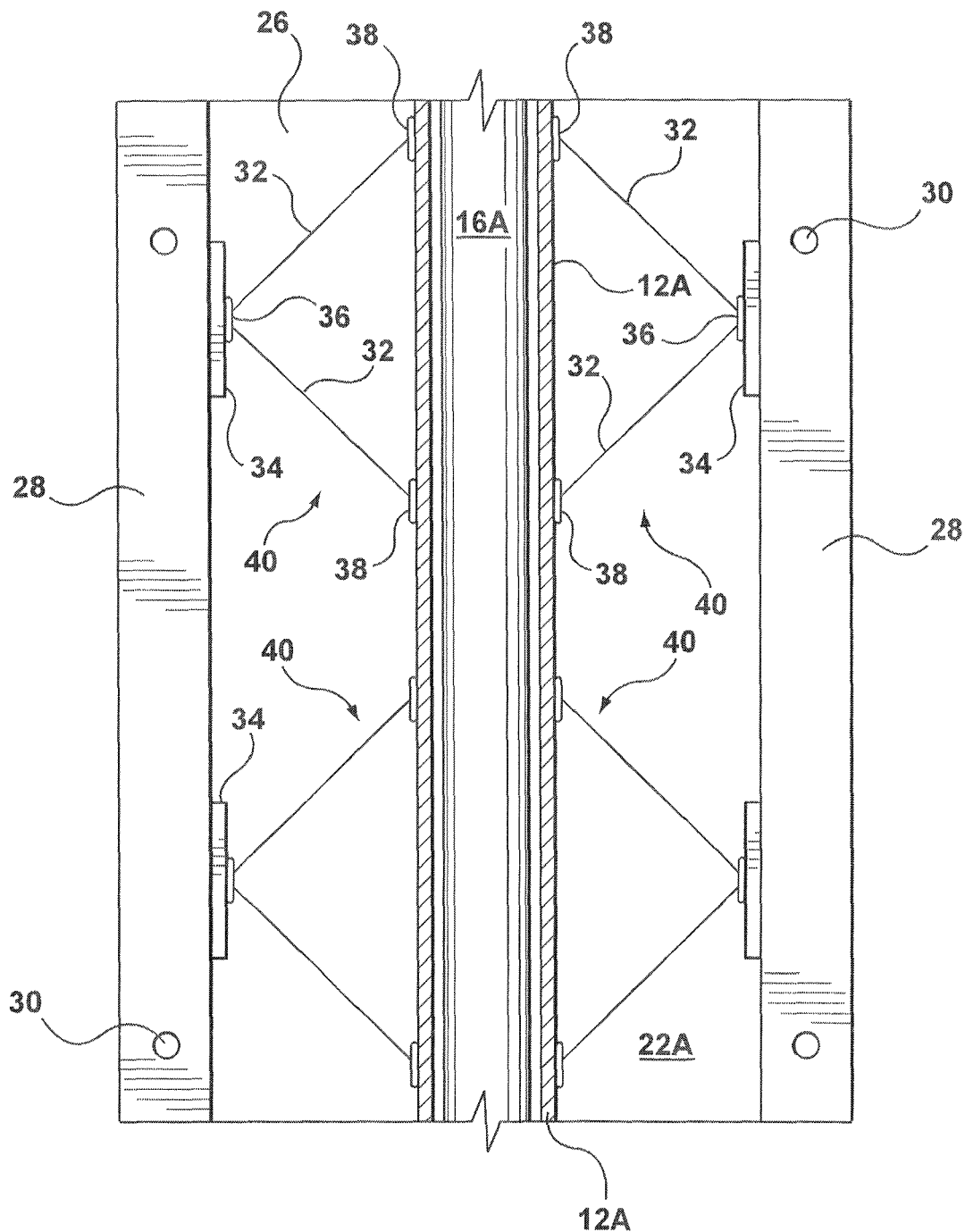
FIG. 5 is a sectional view of part of the receiver coil assembly, taken along the lines V-V of FIG. 4.

As best seen in FIG. 5, each fastening assembly 40 includes an elastic suspension member 32 that extends between the inner wall of the tubular frame member 14A and the inner frame member 12A. In one example embodiment, each elastic suspension member 32 (which may for example be formed from rubber) is secured at opposite first and second ends 38 to longitudinally spaced locations on a side of the inner frame member 12A, and at an approximate mid-point 36 to the inner wall of the tubular frame member 14A such that the elastic suspension member 32 forms a "V" shape that applies opposing longitudinal forces to the inner frame member 12A as well as a lateral force. (It will be appreciated that the "V" shaped elastic member could be replaced with two separate elastic pieces.) A fastening block 34 may be secured by adhesive or other fastener to the inner wall of the tubular frame member 14A to provide a surface for securing the mid-point 36 by a bolt or other fastener. In the illustrated embodiment, fastening assemblies 40 are located in pairs on opposite sides of the inner frame member 12A such that substantially equal but opposite forces are applied to the inner frame member 12A by the elastic suspension members 32 so that the inner frame member 12A normal resting position is in the center of the coil passage 22A defined by tubular frame member 14A, regardless of the orientation of the frame 10. In one example embodiment, the elastic suspension members 32 in a tubular frame member 14A are all secured to one half-cylindrical section 26 thereof to facilitate securing the inner frame member 12A in place before closing up the receiver coil passage 22A with the other half-cylindrical section 26.

Elastic members 32 can be formed from rubber or other suitable elastic or resilient material. The fastening assembly 40 could take many configurations different from that shown in FIGS. 4 and 5 to elastically suspend the inner frame member 12A.

Referring again to FIG. 4, in some embodiments the inner frame member 12A has a V-shaped cross-section and defines an open-sided trough 42 that provides an inner cable passage 44 in which the receiver coil 16A is received. In some example embodiments, the inner frame member 12A could alternatively have a semi-rectangular, or semi-circular or circular or other cross-sectional area. In at least some embodiments the receiver coil 16A is a loop or multi-turn coil formed that is secured in the trough 42 by tape and/or other type of fastening mechanism.

Figure 6:
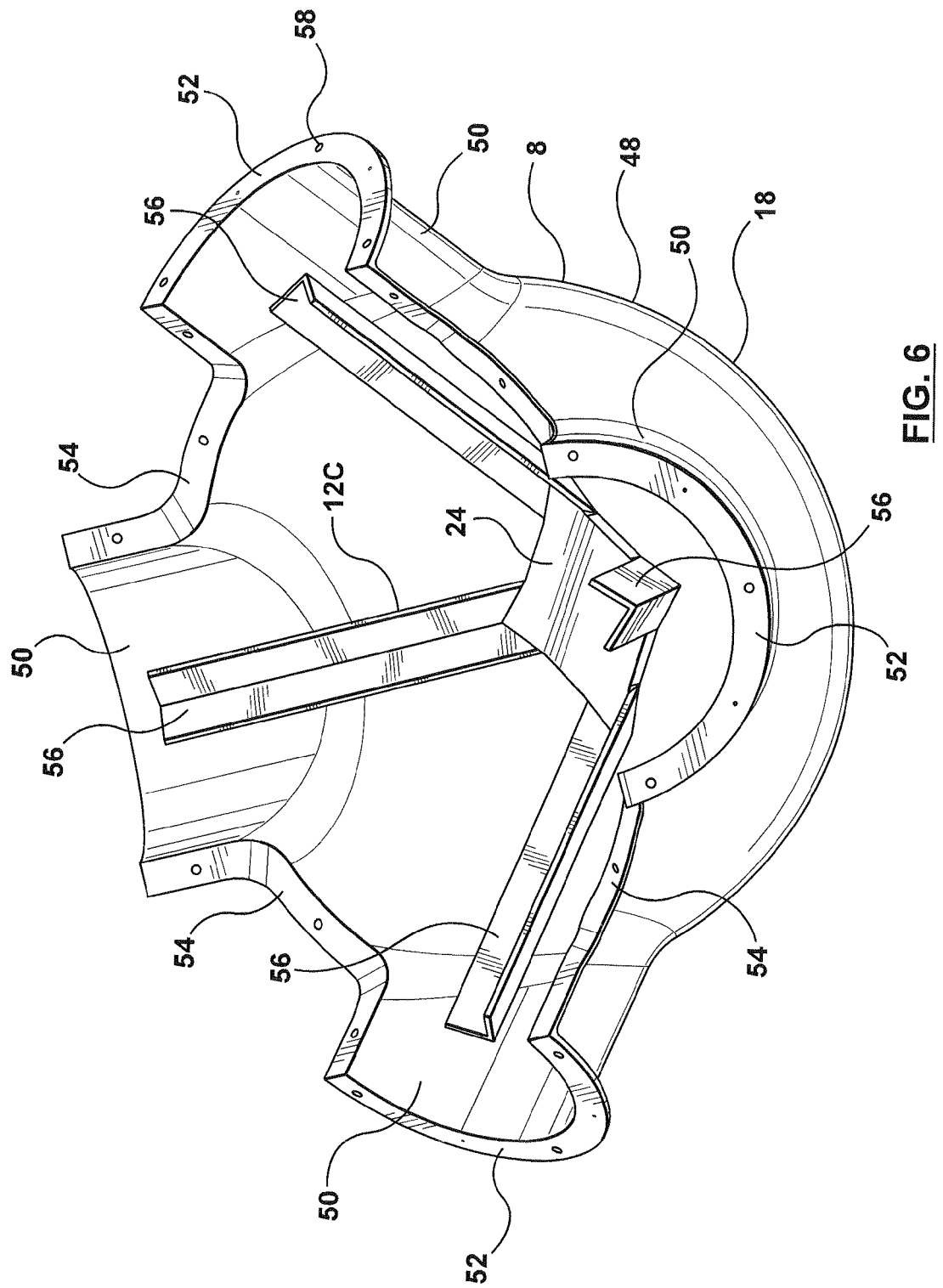
FIG. 6 is a perspective view of a corner section of the receiver coil assembly of FIG. 1.

In the illustrated embodiment, the octahedronal skeletal frame 8 includes a total of twelve tubular frame members 14A, 14B and 14C (four of each of members 14A, 14B and 14C) and six corner sections 18. Each of the corner sections joins a pair of the tubular frame members that support one of the receiver coils with a pair of the tubular frame members that support one of the other two receiver coils, such that portions of two receiver coils pass through each of the corner sections 18. FIG. 6 illustrates, without showing any receiver coils, one of the corner sections 18 in greater detail according to an example embodiment. The corner section 18 includes a removable inner wall section 62 (removed in FIG. 6—see FIG. 2C) and an outer basket section 48. Outer basket section 48 includes a semi-spherical central portion from which four semi-cylindrical stubs 50 extend. Each of the stubs 50 has a lateral peripheral flange 52 for mating with a corresponding flange 60 (FIG. 2C) on a corresponding tubular frame member 14A, 14B or 14C. Aligned securing holes 58 are provided along the flanges 52 and 60 for securing them together. The inner wall section 62 has a shape that corresponds to that of the outer basket section and includes peripheral flange portions that mate with flange portions 54 of the outer basket sections and flanges 60 of the corresponding tubular frame members 14A, 14B or 14C. The inner frame 12 includes inner corner portion 24 that includes trough-defining arms 56 that are secured to inner frame members 12A, 12B and 12C, and which support a pair of the receiver coils at the point where they overlap at the corner section 18. In some example embodiments, the inner frame corner portion 24 is secured to the outer frame basket section 48 and/or the removable inner wall section 62 by elastic members, however in some embodiments the inner frame corner portion 24 is only connected to and supported by the remainder of the inner frame 12.

In at least some configurations, the skeletal octahedronal receiver coil assembly 10 provides relatively light weight structure for housing and supporting the three receiver coils 16A, 16B and 16C in different planes about a common central point. Furthermore, the skeletal nature of the receiver coil assembly can mitigate the drag caused by a fluid such as air or water passing through the assembly 10 when compared for example to a solid spherical tow assembly. The elasticised suspension of the internal frame 20 can in at least some applications mitigate against noise causing vibrations that the receiver coils may otherwise be subjected to. The octahedronal structure of skeletal frame 8 can in at least some example embodiments provide a strong structure for maintaining the receiver coils 16A, 16B and 16C in substantially stable positions relative to each other.

Figure 7A:
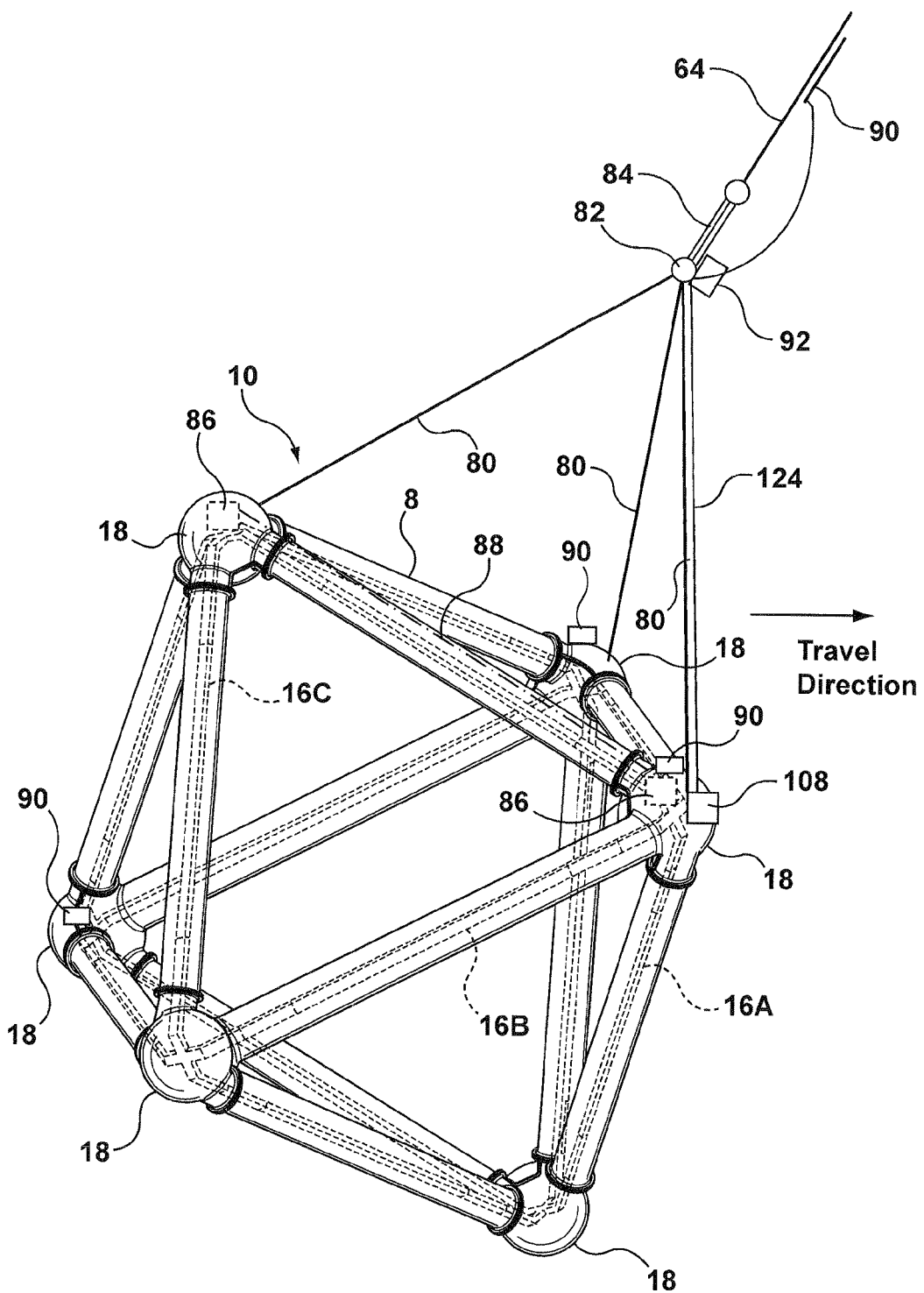
FIG. 7A is a perspective view showing a possible tow rope connection for the receiver coil assembly of FIG. 1.

FIG. 7A illustrates one possible towing configuration for towing the tow assembly 10 from an aircraft or other carrier. In the illustrated example three connecting ropes 80 have first ends that are each respectively connected to three upper corners 18 of the tow assembly frame 8 and opposite ends that are connected to a common connector 82. The first ends of the connecting ropes 80 can for example be connected to connecting loops or eyes (not shown) provided on the corners 18, or be tied directly to the corners of the frame 8. In some example embodiments the common connector 82 is connected by one or more bungee-type cords 84 to the end of a tow rope 64, which is attached to an aircraft. Bungee cords 84 (or a suitable elastic alternative) can in some configurations assist in isolating the receiver coil assembly 10 from aircraft vibrations. The lengths of the respective connecting ropes 80 can be different from one rope to the next and can be selected to provide the frame 8 with different desired orientations at different horizontal flight speeds. For example, the connection rope lengths could be selected so that at a typical survey speed the receiver coils 8 have a certain orientation such as shown in FIG. 7A, but at low or no horizontal speed the frame 8 can be vertically lowered to land generally simultaneously on three lower corners 18 in the position shown in FIG. 1 to reduce landing and take-off stresses on the frame. In some embodiments one or more fins or baffles formed from fabric or other light-weight material can be selectively placed on one or more portions of the frame 8 to provide an air interface surface to result in a desired orientation of the frame 8 during flight.

In some example embodiments, pre-amplifiers are included in the frame assembly and connected to leads from the receiver coils 16A, 16B and 16C for amplifying the signals received by receiver coils 16A, 16B and 16C. For example, as illustrated in FIG. 7A, pre-amplifiers 86 can be provided inside one corner 18 of the frame 8 for the two receiver coils that pass through that corner (for example coils 16A and 16B), and a further preamplifier 86 for the other receiver coil (for example coil 16C) provided in inside another corner 18 of the frame. A junction box 108 located on one of the corners 18 can be connected to each of the receiver coils 16A, 16B and 16C through pre-amplifiers 86. The junction box 108 is in turn connected to electrical cables 124 that extend adjacent one of the connecting cables 80 and along the tow rope 64 to a data monitoring computer that receives information from the receiver coils 16A, 16B and 16C, and a power source used for powering pre-amps 86 and other active devices such as GPS receivers or other positional devices that may be attached to the frame 8. In some embodiments, leads from a pre-amplifier 86 located at one corner 18 of the frame to the junction box 108 may be provided internally within one of the tubular members of the frame, spatially separated from the receiver coil in that particular tubular member, as indicated by the dashed line 88 in FIG. 7A.

In some example embodiments positional sensors 90 such as GPS sensors and/or accelerometers can be located at one or more locations of the frame 8—for example, FIG. 7A illustrates three GPS antennas 90 located at three respective corners 18 of the frame 8, which are electrically connected to a GPS receiver 92 that is mounted to the connector 82 or tow cable 64. In some example embodiments, other positional technology could be mounted to the frame 8, for example the Novatel™ SPAN positioning technology such as the SPAN IMU-LN200 or SPAN CPT—on some cases a sub-frame may be attached to frame 8 to mount positioning technology at the center of the frame.

Figure 7B:
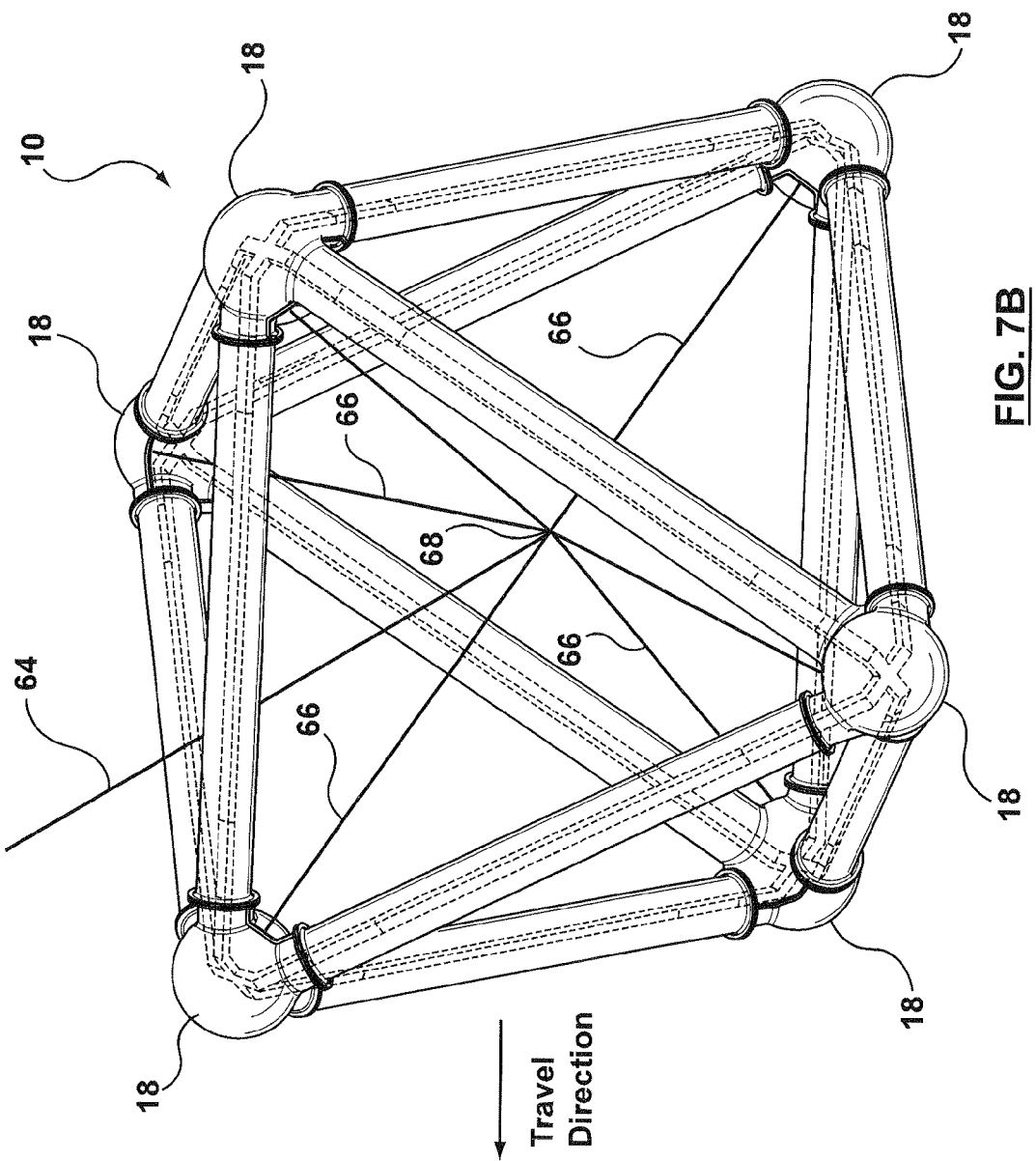
FIG. 7B is a perspective view showing a possible tow rope connection for the receiver coil assembly of FIG. 1.

FIG. 7B illustrates another possible tow cable configuration for towing the tow assembly 10 from an aircraft or other carrier. In the illustrated example, a separate connection rope 66 extends from each of the corner sections 18 of the receiver coil assembly 10 to a central hub connection 68 that is secured to a tow rope 64. The lengths of at least some of the respective connecting ropes 66 may be different to provide a desired flight orientation for the receiver coil assembly. The connecting ropes 66 may also apply tension to the respective corner sections 18 and thereby add strength and rigidity to the receiver coil assembly 10. The tow cable configuration can vary from that shown in FIG. 7 depending on the application—for example the assembly could alternatively be suspended from a net or connection ropes 66 connected to portions of the frame 8 other than or in addition to the corners 18.

In some example embodiments, the tow cable configuration is selected (for example by connection cable length and location, and perhaps through the use one or more stabilizer fins attached to tow assembly 10) so that the receiver coil axes are substantially maintained in a desired orientation during flight, for example, one coil axis being in a vertical direction, one coils axis being oriented in a direction of travel, and one coil axis being horizontally oriented at a right angle to the direction of travel.

In one example embodiment, electrical leads for each of the receiver coils 16A, 16B and 16C pass through respective openings provided in the outer frame 8 and are connected to electrical cables that are secured to the tow rope 64 so that the receiver coils 16A, 16B and 16C can be remotely monitored from the towing aircraft.

As will be appreciated from the above description, in example embodiments the coil assembly 10 is constructed in such a manner that it can be disassembled and transported and then reassembled at a survey location. As noted above, in example embodiments the internal frame section 20A, internal frame section 20B and internal frame section 20C are each formed by four elongated frame members 12A, 12B, 12C respectively connected by corner sections 24, and the receiver coils 16A, 16B and 16C are each secured by tape or adhesive or other fasteners within the respective coil channels or passages 42 of the elongated frame members 12A, 12B and 12C. With reference to internal frame section 20A, in an example embodiment, corner sections 24 are releasably connected at the ends of the four straight frame members 12A that such that during disassembly of the tow assembly 10, the four straight elongated frame members 12A can be removed from the receiver coil assembly 10 together with the receiver coil 16A still secured to elongated frame members 12A such that the receiver coil 16A will be substantially rigid along four sides but flexible at four corners, which allows the receiver coil (together with the four straight elongated frame members 12A) to be folded into a compact bundle in which the four straight elongated frame members 12A are all positioned parallel to each other while maintaining continuity of the conductors that make up the receiver coil and allowing the receiver coil 16A to be subsequently reinstalled in the receiver coil assembly 10 in a substantially similar configuration. Internal frame sections 20B and 20C that support receiver coils 16B and 16C respectively can similarly be removed and folded for transportation.

In some example embodiments, the tubular frame members 14A, 14B and 14C, and the inner frame members 12A, 12B and 12C can each be formed from a plurality of shorter segments secured together, and in this regard FIG. 8 illustrates a tubular frame member 14B that is formed from a plurality of sub-sections 70 that are secured together at mating portions by fasteners 72. Segmented frame members can facilitate transportation of larger receiver coil assemblies to and from a survey location as kits that can be assembled and disassembled on location. Furthermore, the same frame members can be used to assemble different size frames 8.

Figure 9:
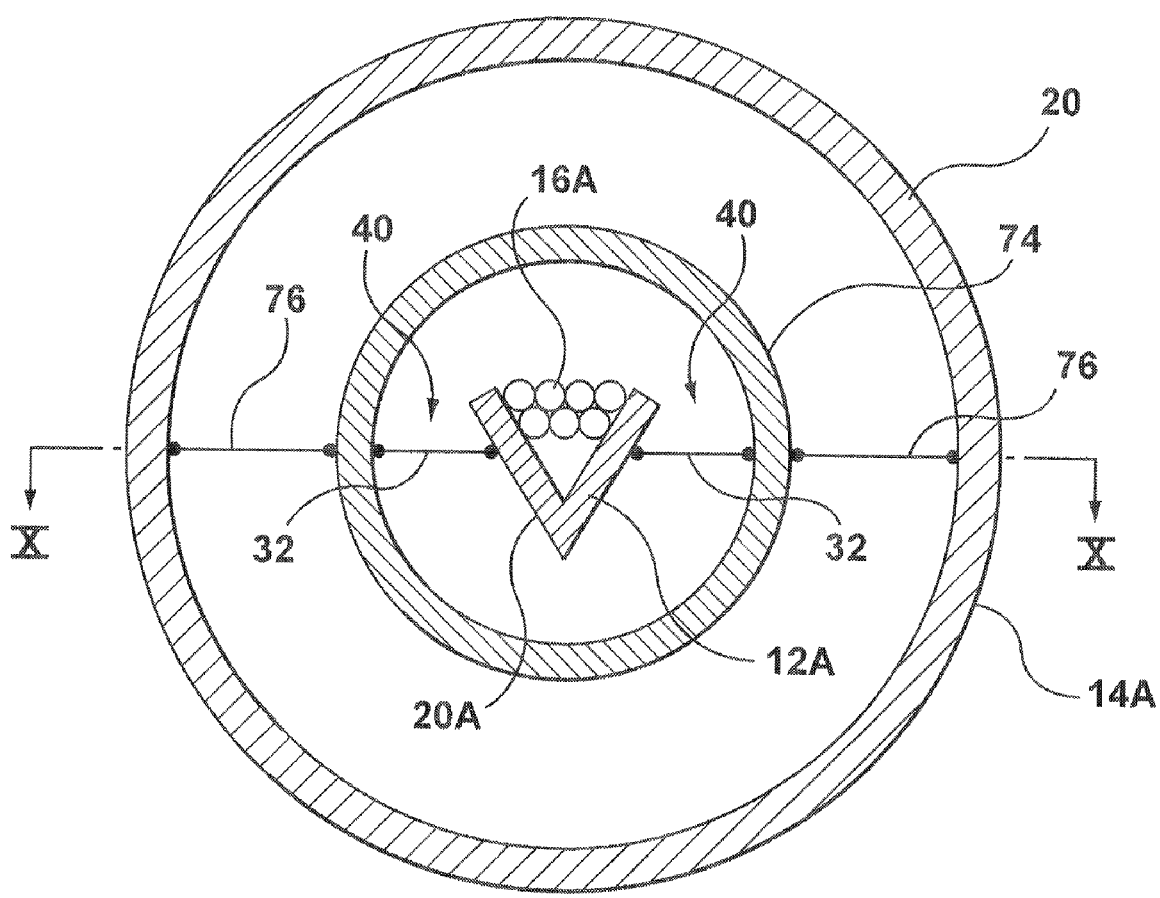
FIG. 9 is a sectional view of part of the receiver coil assembly, according to an alternative embodiment, taken along the lines IV-IV of FIG. 2A.
Figure 10A:
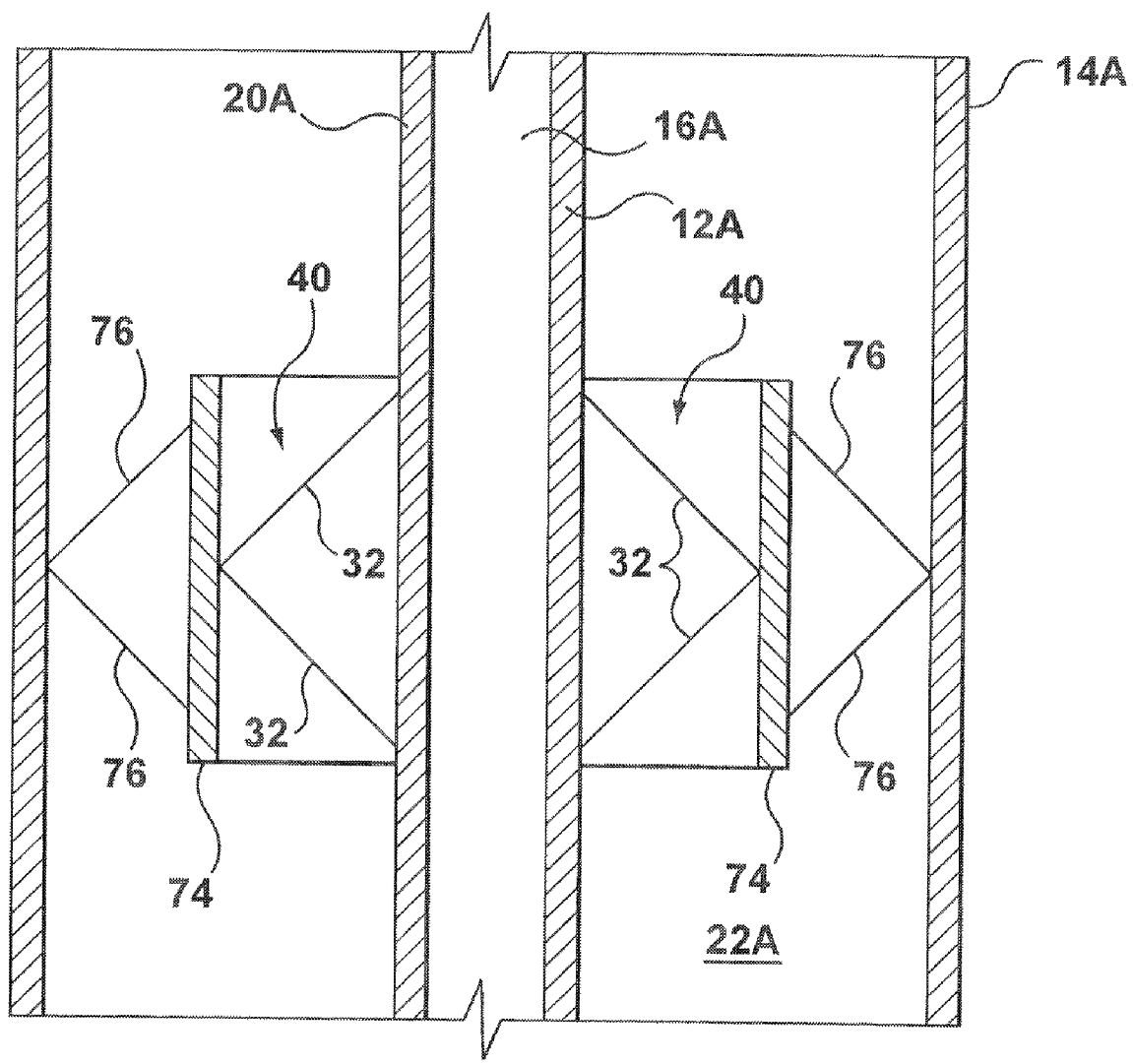
FIG. 10A is a sectional view of part of the receiver coil assembly, according to an alternative embodiment, taken along the lines X-X of FIG. 9.

Referring to FIGS. 9 and 10A, in another alternative embodiment, a double suspension system is used to suspend the receiver coil interior frame 20 within the outer frame 8 of receiver coil assembly 10. Although FIGS. 9 and 10A illustrate the frame sections 8A and 20A used to house receiver coil 16A, the frame sections 8B, 20B and 8C and 20C, are substantially identical to what is shown in FIGS. 9 and 10A. In the double suspension configuration of FIGS. 9 and 10A, the suspension assemblies 40 located along the lengths of each of the internal frame members 12A, 12B and 12C are connected to intermediate frame members 74, which are in turn suspended from the outer frame members 14A, 14B and 14C. For example, first elastic suspension members 32 opposingly suspend the inner frame member 12A in the center of a cylindrical or semi-cylindrical intermediate member 74, which is then centrally suspended in a similar manner by further elastic members 76 that extend between the cylindrical intermediate member 74 and the outer frame member 14A. As can be seen in FIG. 10A, the further elastic members 76 can also be arranged in V-shaped pattern to act against longitudinal movement as well as radial movement in a similar manner as the first elastic suspension members 32.

Thus, in the embodiment of FIGS. 9 and 10A, the inner frame section 20A that supports receiver coil 16A is suspended by a number of first elastic suspension members 32 from a number of respective intermediate frame sections 74 which are in turn suspended by one or more second elastic suspension members 76 (which may for example be formed from rubber) from the outer frame 8A. The inner frame section 20A may further be positioned at or near the centre of the outer frame. Regions that are (i) proximate the connections between the first suspension members 32 and each of the inner frame section 20A and the intermediate frame sections 74, and (ii) proximate the connections between the second suspension members 76 and each of the intermediate frame sections 74 and the outer frame 8A can be coated with a friction reducing agent such as silicone. A silicone coating may reduce the noise caused by rubbing at the attachment or connection point. In some example embodiments, the first suspension members may be connected to the respective frame sections by cable ties that pass through pre-drilled holes or attached loops. Alternatively, any number of other possible methods can be used to attach the first and second suspension members including: hooks, or a machined hook-like attachment point connected to the attachment points whereby the suspension members may be looped around the hooks and then covered by silicone; alternatively, loops on the first and second suspension members can be screwed into the attachment points; another possibility is to glue the first and second suspension members to the inner frame, and to the outer frame or intermediate frame sections.

As shown in FIGS. 9 and 10A both the first and second suspension members 32 and 76 extend at an angle other than 90 degrees to both radially and longitudinally bias the inner frame sections 20A, 20B and 20C and the receiver coils 16A, 16B and 16C in a central position in internal receiver coil passages 22A, 22B and 22C, respectively. The single and double suspension arrangements that are discussed above may in at least some embodiments improve the signal to noise ratio ("SNR") of the receiver coil assembly by reducing the effects of vibration of the receiver coil assembly 10 on the receiver coils 16A, 16B and 16C. In other example embodiments, other support mechanisms can be used including triple-suspension, springs, surrounding the coil with foam, or other means of positioning the coil in the centre of the inner frame in a manner that reduces noise.

In some embodiments the location and positioning of the suspension members may vary throughout the receiver coil assembly—for example, a greater number of elastic suspension members may be positioned at an intended top of the assembly than are positioned toward a bottom.

Figure 10B:
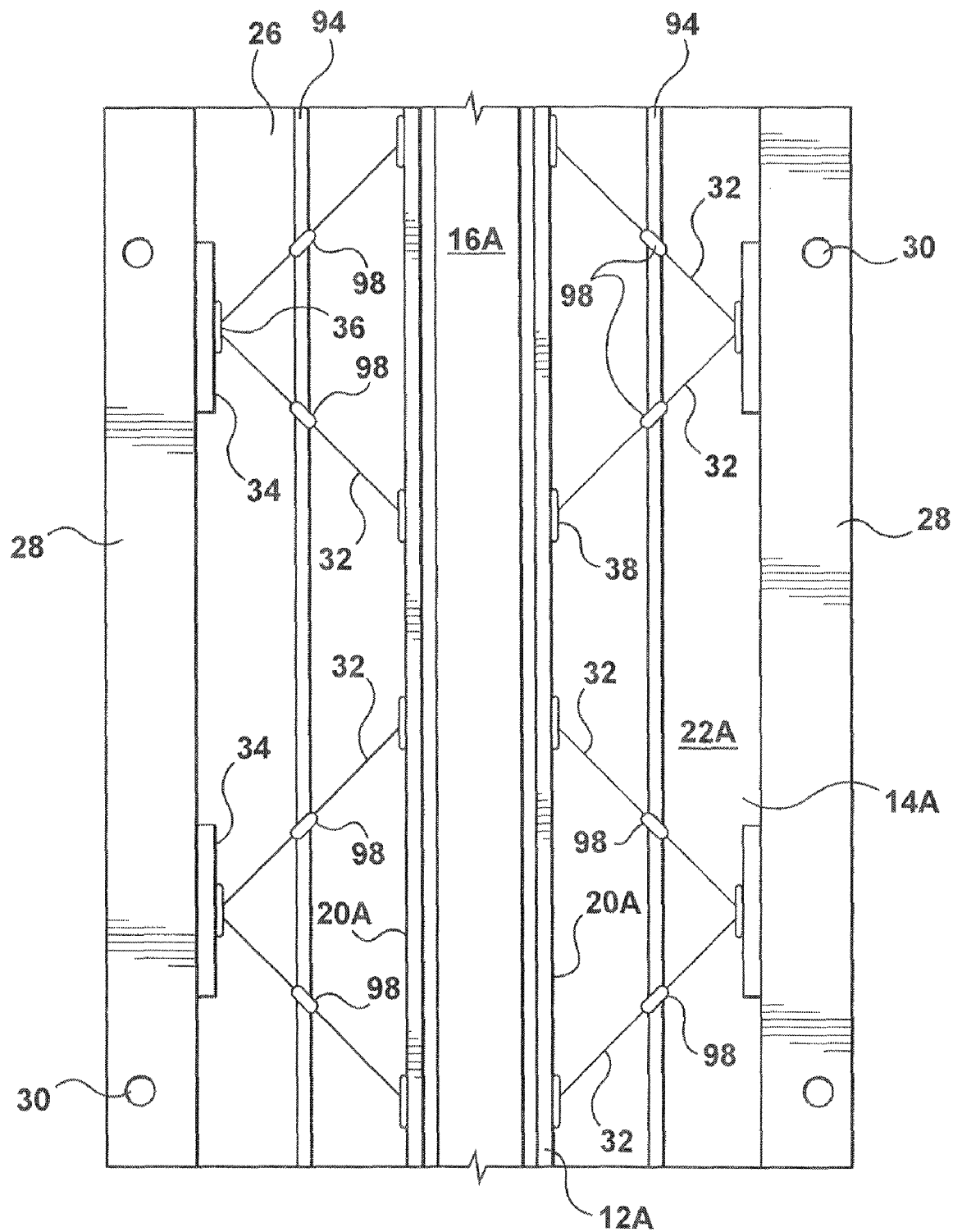
FIG. 10B is a sectional view of part of the receiver coil assembly, according to another alternative embodiment.
Figure 10C:
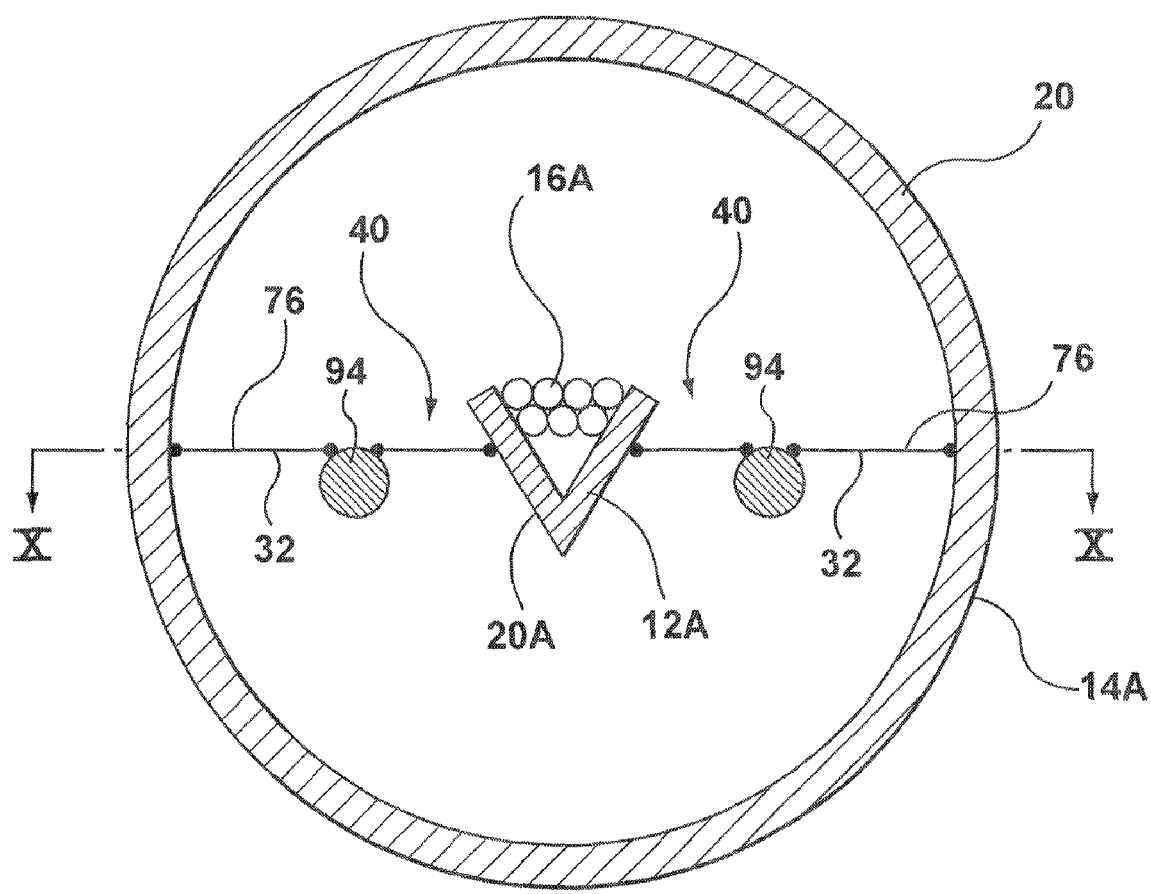
FIG. 10C is a sectional view of part of the receiver coil assembly taken at right angles to the sectional view of FIG. 10B.

FIGS. 10B and 10C illustrates another possible suspension configuration of the internal frame 12 for receiver coil assembly 10. Although FIGS. 10B and 10C illustrate the frame sections 8A and 20A used to house receiver coil 16A, the frame sections 8B, 20B and 8C and 20C, are substantially identical to what is shown in FIGS. 10B and 10C. The configuration shown in FIGS. 10B and 10C is similar to that described above in respect of FIGS. 4 and 5, with the addition of intermediate rigid rods 94 that run longitudinally in cylindrical passage 22A between the opposite sides of the internal frame member 12A and the wall defined by the outer frame member 14A. The elastic suspension members 32 on one side of the internal frame member 14A of frame section 20A are each attached at approximately a midpoint 98 to one of the rigid rods 94, and the elastic suspension members 32 on the opposite side of the internal frame section 20A are each attached at a midpoint 98 to the other of the rigid rods 94. The rods 94 can tie the suspension members together to spread forces applied to any individual member among a number of suspension members. Additionally, the rods 94 themselves can act as energy absorbing or reflecting structures in that the rods act as a mass or inertia that provides an additional stage of isolation for inner frame from the vibration of the outer frame. In one example embodiment, rods 94 extend substantially the length of the respective frame member 12A in which they are located. The rods 94 can in some embodiments be broken into smaller rod sections. FIG. 10C is further sectional representation, at right angles to the view of FIG. 10B, illustrating the suspension system. Rods 94 can be formed for example from fiberglass or other composite materials or metal in some embodiments.

Figure 10D:
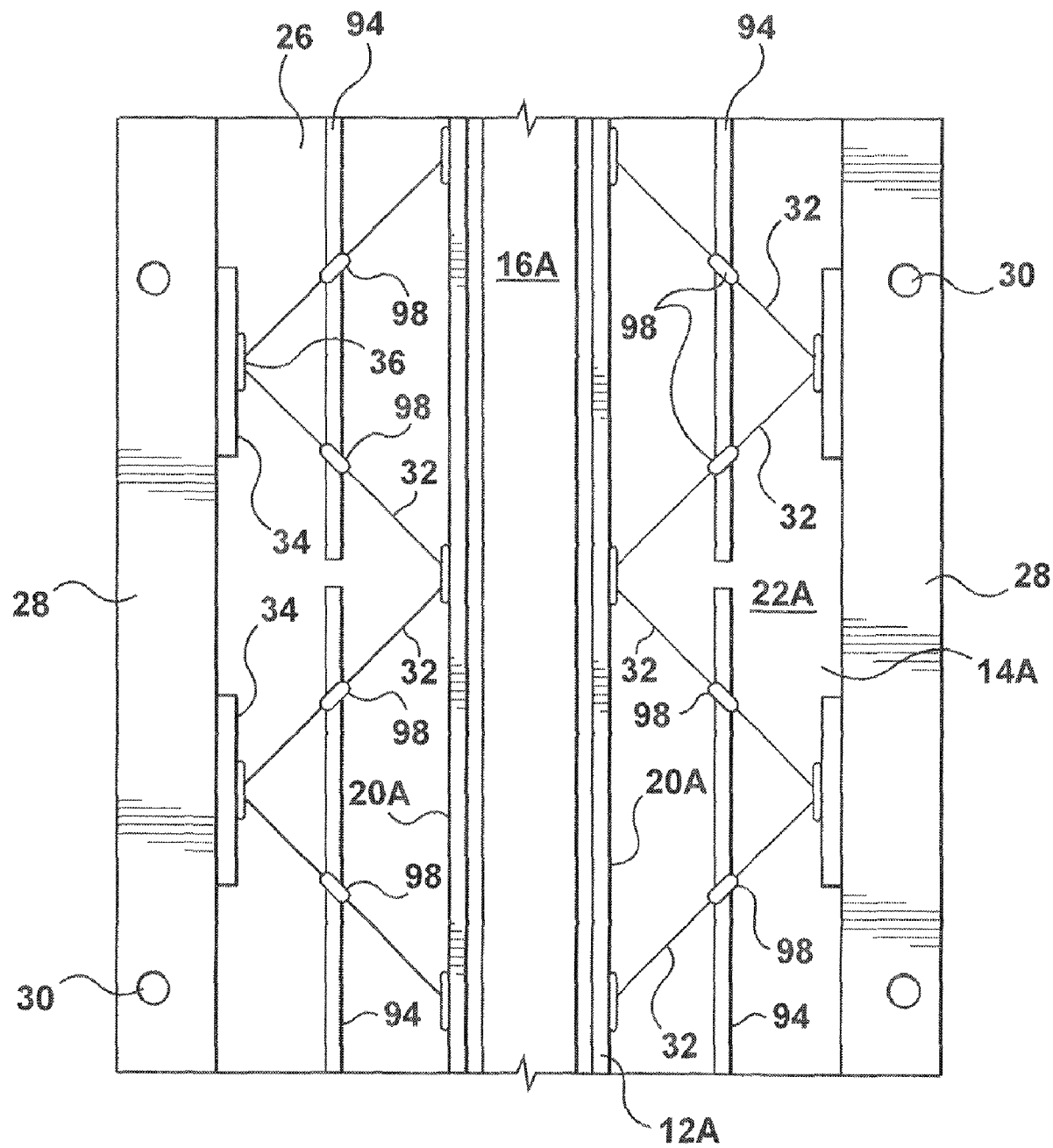
FIG. 10D is a sectional view of part of the receiver coil assembly, according to another alternative embodiment.

FIG. 10D illustrates a further variation of the receiver coil suspension system of FIGS. 10B and 10C. In the embodiment shown in FIG. 10D, the elastic suspension members 32 on each side of the receiver coil 16A are formed from a single elastic member that extends in a zig-zag back and forth fashion between the inner frame member 12A and the outer frame member 14A. Rods 94 are secured at the midpoints of the suspension members 32. FIG. 10 also illustrates rods 94 broken into smaller rod sections.

In addition to being used in a three receiver coil tow assembly as described above, the elastic receiver coil suspension systems shown in the figures and described above can also be applied to receiver coils used in other configurations, including for example single coil tow assemblies that include only a single receiver coil and double coil tow assemblies.

Figure 15:
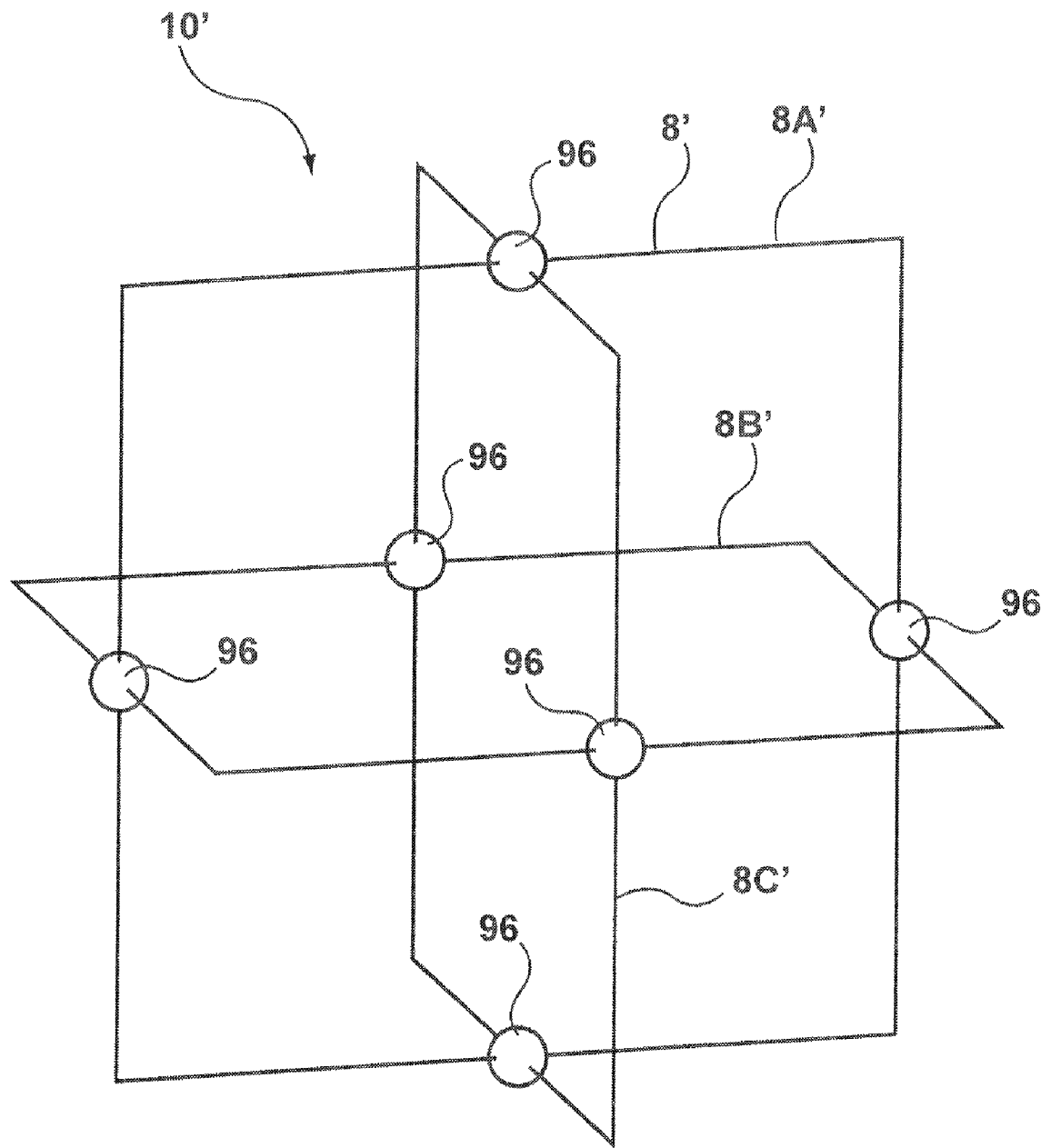
FIG. 15 is another example embodiment of a possible skeletal frame for a receiver coil assembly.
Figure 16:
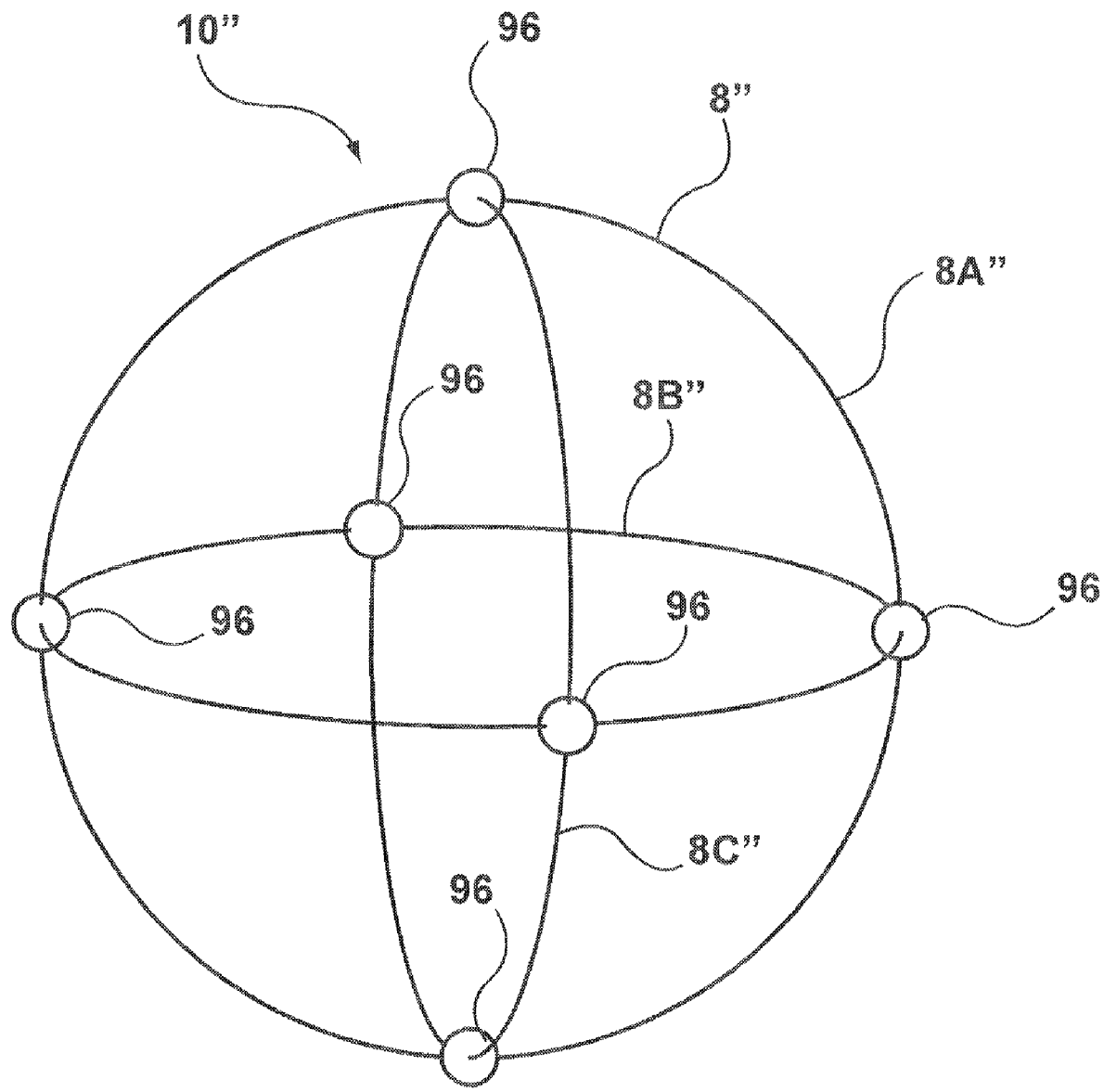
FIG. 16 is another example embodiment of a possible skeletal frame for a receiver coil assembly.

Although octahedronal receiver coil assembly 10 has been shown in the Figures, the skeletal receiver coil assembly 10 could alternatively employ different shapes and arrangements of encased receiver coils. For example the skeletal frame could includes receiver coil frame sections that collectively define a skeletal spherical shape, or cubic, or pyramidal, for example. Additionally, more than three receiver coils could be used in some applications. For example, FIG. 15 shows an example of a receiver coil assembly 10' that is substantially similar to assembly 10 except that the three orthogonal tubular square frame sections 8A', 8B' and 8C' of skeletal frame 8' are connected to each other at mid-points 96 rather than at corners. FIG. 16 shows an example of another receiver coil assembly 10" that is substantially similar to assembly 10 except that the skeletal frame 8" has a generally spherical profile and is formed from three intersecting tubular circular frame sections 8A", 8B" and 8C" that interconnect at points 96.

A description of example embodiments of a receiver coil assembly 10 having been provided, some examples of how a receiver coil assembly 10 can be used will now be explained in greater detail.

Multi-Axis AFMAG

In one example embodiment, receiver coil assemblies 10 are used in the implementation of an airborne AFMAG geological survey system for measuring audio and sub-audio frequency magnetic fields resulting from naturally occurring signal sources such as lightening discharges. Existing AFMAG based airborne geological survey systems typically operate based on the assumption that in the absence of local conductors the naturally occurring AFMAG magnetic field components measured above a surveyed terrain will have a random direction but lie in a horizontal plane, whereas the presence of a local conductor or a local magnetic body in the surveyed terrain will change the directions of the magnetic field components so that they are not horizontal. However, the assumption that natural magnetic fields are horizontal if there are no changes in subsurface conductance can introduce errors in some applications as the ionosphere conductors are not homogeneous and stable in time and can also cause changes of the audio-magnetic field vertical component. Error can also be caused by instability of the sensor coil assembly spatial attitude during a survey flight as any angular rotation of the sensor coils produces an equal error when measuring tilt angles. This error can be mitigated by using attitude sensors such as shown in U.S. Pat. No. 6,876,202 (Morrison et al.) but in some situations where base station measurements are used in combination with flight measurements the accuracy of error correction can be affected because of the unknown differences between the audio-magnetic field magnitudes in the base and flight points. Unlike typical AFMAG technologies, example embodiments are described herein in that do not rely on the relationship between vertical and horizontal components of the audio-magnetic field (or tilt angles) but rather on the relationship of the audio magnetic field 3D-vector magnitudes at two (or more) different points of the survey area at the same time.

Figure 11:
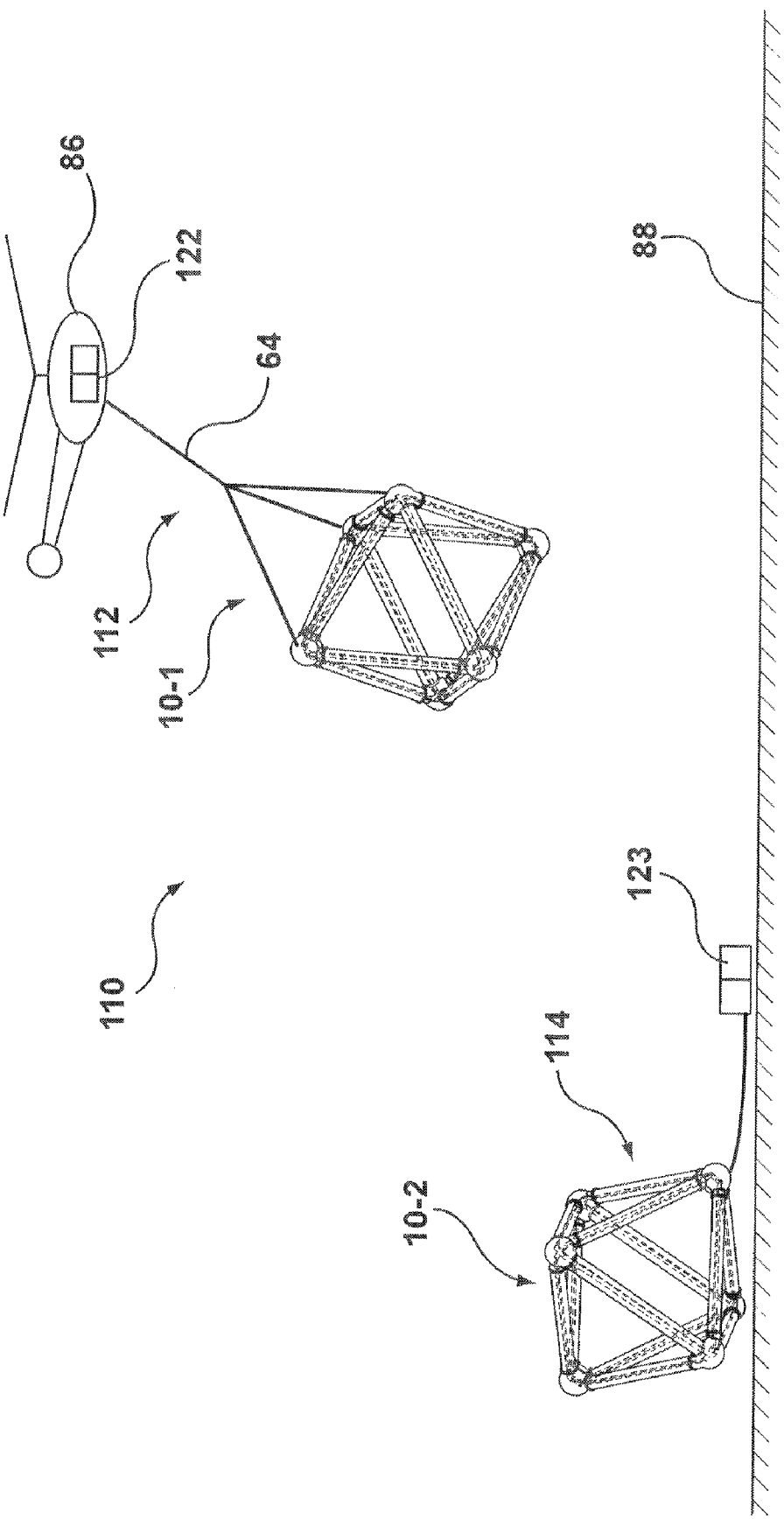
FIG. 11 shows a representation of an AFMAG geophysical prospecting system according to one example embodiment of the invention.

Referring to FIG. 11, a geophysical prospecting system 110 according to one example embodiment of the invention includes at least two spatially separated sensor systems 112, 114 for simultaneously measuring three dimensional ("3D") vector magnitudes at two different locations in a survey region. In one example embodiment, the sensor systems 112 and 114 are substantially functionally equivalent and each include 3D vector magnetic sensors. One sensor system 112 includes a towed receiver coil assembly 10-1 suspended from a tow cable 64 and towed by an aircraft 86 such as a helicopter or airplane or airship over a survey region, and the other sensor system 114 includes a ground based receiver coil assembly 10-2 that is stationary and located on the ground 88. As will be explained in greater detail below, each of the sensor systems 112, 114 includes three electromagnetic sensors arranged for measuring the magnitude of the audio-electromagnetic field in three different dimensions. In one example embodiment, the receiver coil assemblies 10-1 and 10-2 are each implemented using a receiver coil assembly that is substantially identical to either the single suspension coil assembly 10 described above in respect of FIGS. 1-8, or the double suspension coil assembly 10 described above in respect of FIGS. 9 and 10A, or the suspension systems described above in respect of FIGS. 10B-10D.

In at least some applications, the geophysical prospecting system 110 is less sensitive to naturally occurring variations not caused by the presence of a conductor in audio-magnetic field tilt angles (for example variations caused by the ionosphere or changes in the surface terrain) and are not as dependant on the aircraft-towed sensor's spatial attitude as typical AFMAG systems. As known in the art, the Earth's natural electromagnetic field in the audio-frequency range can be observed and measured almost everywhere. The most stable frequency range that is least dependant on ionosphere conditions changes is typically 8-400 Hz, which is thus a convenient range for geophysical surveys. In some applications, the measurement range begins at approximately 25 Hz because motion-induced noise on an aircraft towed sensor assembly tends to be greater at lower frequencies, however in some configurations it may be possible to measure at frequencies lower than 25 Hz, such as 8 Hz, and higher than 400 Hz. When a region has an electrically homogeneous material beneath the earth's surface, the magnetic component of the alternating natural electromagnetic fields in the region will also be homogeneous. Thus, when a survey of the region is conducted using an airborne sensor system 112 and a stationary base station sensor system 114, the 3D vector magnitude of the audio magnetic field measured at the stationary ground station sensor system 112 and the aircraft towed sensor system 114 will typically be the same except for differences due primarily to the sensor system's 112, 114 spatial separation. In the case where underground conductors or other scattering bodies are present, the field intensity in a region is non-homogeneous, and varies throughout the region due to additional electromagnetic fields generated by the eddy currents induced through natural electromagnetic events in the underground conductors.

The differences in the 3D vector magnitude of the audio magnetic field measured at the stationary ground base station sensor system 114 and the aircraft towed sensor system 112 will typically be greatest over an underground conductor, and this difference is used in the geophysical prospecting system 110 to detect possible underground conductors. Thus, the peaks of the anomalies detected using the geophysical prospecting system 110 are, in at least some applications, located over the top of underground electrical conductors, as compared to typical tilt-angle based AFMAG systems that rely on field tilt angles in which the peak anomalies occur at the sides of the conductors (e.g. at the transition between materials of differing conductivity). In at least some applications, the geophysical prospecting system 110 described herein which detects anomalies over the tops of conductors may facilitate easier geological interpretation as the total field intensity anomalies may be stronger than the Z-component-only anomalies which are used in the known tilt-angle AFMAG systems, thereby providing a better signal-to-noise ratio. Furthermore, in at least some example embodiments the 3D vector field magnitude comparison system described herein does not require any attitude sensors which can simplify system instrumentation.

Figure 12:
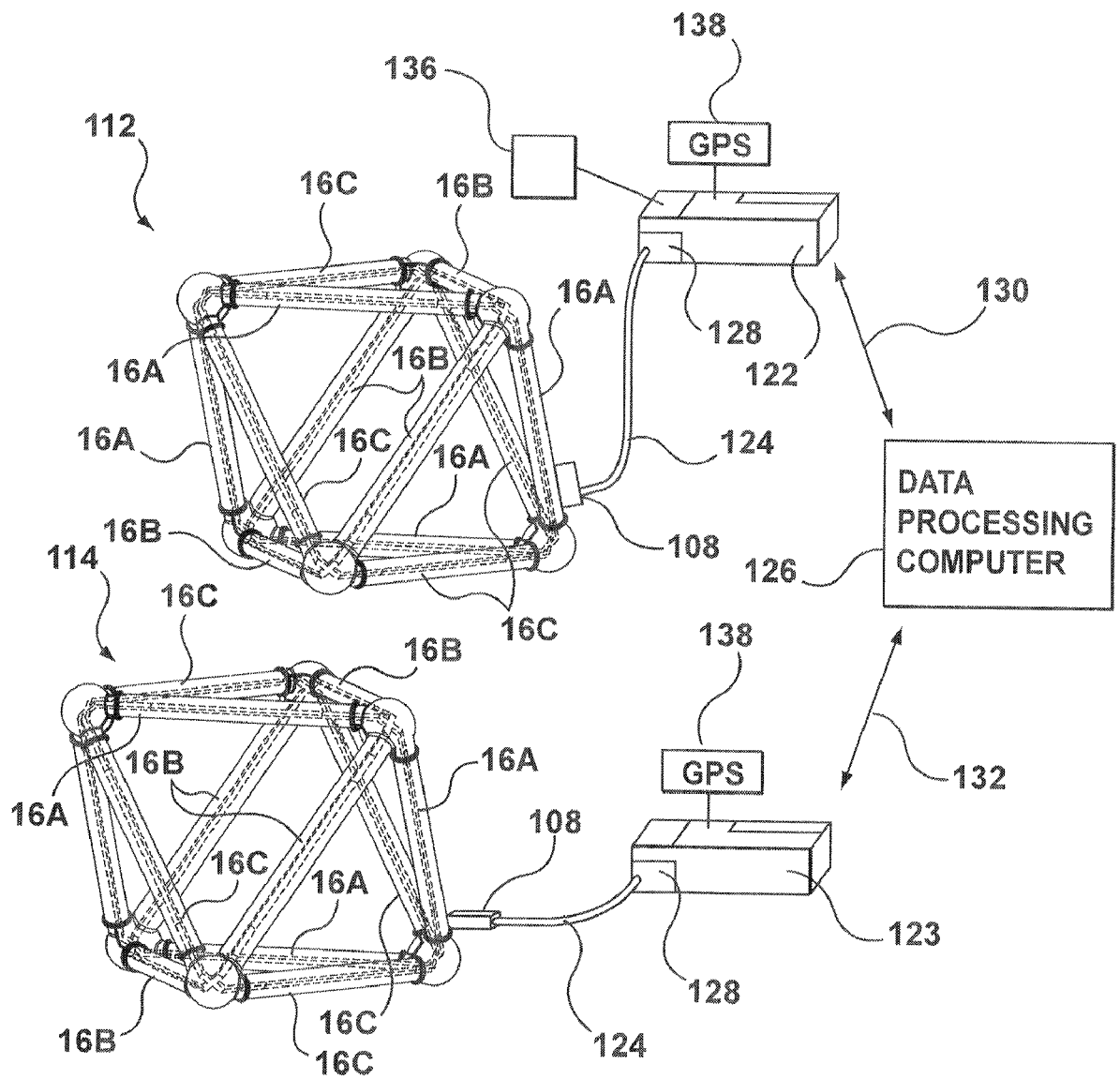
FIG. 12 is a schematic view of the geophysical prospecting system of FIG. 11.

An overview having been provided, the airborne geophysical prospecting system 110 will now be described in greater detail with reference to FIGS. 11 and 12. In one example embodiment, the towed receiver coil assembly 10-1 of the airborne sensor system 112 includes three electromagnetic sensors 16A, 16B and 16C in the form of three substantially planar coils that are substantially orthogonal to each other. For example, in one embodiment a first or Z-axis coil 16A has a dipole axis that runs along a Z-axis, a second or X-axis coil 16B has a dipole axis oriented in an X-axis direction, and a third or Y-axis coil 16C has a dipole axis that is oriented along a Y-axis direction. The X, Y and Z-axes are fixed relative to receiver coil assembly 10-1 rather than any external reference and correspond to three lines that intersect at a common point substantially at the center of receiver coil assembly 10-1, with each axis being orthogonal to the other two axes.

In one non-limiting example embodiment, the orthogonal Z, X and Y sensor coils 16A, 16B and 16C are multi-turn air-core coils having a diameter of three meters and an effective area of 1000 square meters each; however other effective areas and other sensor shapes and configurations can be used. As will be appreciated from the above description of FIGS. 1-10, the receiver coil assembly 10-1 can in at least some applications maintain a substantially consistent coil area for each of the coils 16A, 16B and 16C and maintain a substantially consistent relative attitude and spacing between the coils.

Analog signals that are representative of the natural magnetic field strength from the Z-coil 16A, the X-coil 16B and the Y-coil 16C are provided through a connection box 108 (which may include a low noise amplifier) and cable 124 to an airborne data collection computer 122 that will typically be located inside aircraft 86. Computer 122 includes an analog to digital converter device (ADC) 128 connected to receive the analog signals from sensor coils 16A, 16B and 16C. In one example embodiment, the ADC device 128 includes three 24-bit analog to digital converter channels (one for each measurement axis) for digitizing the analog signals from the Z-coil 16A, the X-coil 16B and the Y-coil 16C simultaneously. In one non-limiting example, the channels are each sampled at 2000 Hz, however other sampling rates can be used. The on-aircraft computer 122 is equipped with one or more storage elements that can include RAM, flash memory, a hard drive, or other types of electronic storage to store the digitized signals derived from the towed receiver coil assembly 10-1 and other input devices that are connected to computer 122. Computer 122 may be configured to perform data processing functions on the signals that it receives.

In example embodiments, the airborne sensor system 112 or host aircraft includes a Global Positioning System ("GPS") device 138 such that data obtained from the towed receiver coil assembly 13 can be correlated with a geographical position and a GPS time signal. In an example embodiment, the airborne sensor system also includes an altimeter system 136 connected to the airborne computer 122 in order to correlate the data obtained from the towed receiver coil assembly 10-1 with altitude measurements. In an example embodiment, altimeter system 136 includes an altimeter device that provides data about the relative altitude of the towed receiver coil assembly 10-1 above the actual survey terrain. It may also include a further altimeter device that provides an absolute altitude of the towed receiver coil assembly 10-1 above a fixed reference (for example sea level).

The stationary sensor system 114 is similar to the airborne sensor system 112 but is configured to be placed on a stationary base point, and includes a ground based receiver coil assembly 10-2 that is substantially identical to the towed receiver coil assembly 10-1. In this regard, the ground based receiver coil assembly 10-2 also includes Z, X and Y sensors 16A, 16B and 16C.

As with the airborne sensor system 112, in the stationary sensor system 114, analog signals that are representative of the natural magnetic field strength from the Z-coil 16A, the X-coil 16B and the Y-coil 16C are provided through a connection box 108 (which may include a low noise amplifier) and cable 124 to a data collection computer 123 that will typically be located near the ground receiver coil assembly 10-2. The ground based data collection computer 123 includes an analog to digital converter device (ADC) 128 connected to receive the analog signals from the three sensor coils 16A, 16B and 16C of ground based receiver coil assembly 10-2. In one example embodiment, the ADC device 128 includes three 24-bit analog to digital converter channels (one for each measurement axis) for digitizing the analog signals from the Z-coil 16A, the X-coil 16B and the Y-coil 16C simultaneously. In one non-limiting example, the channels are each sampled at a rate that is similar to the sampling rate used at the airborne sensor system computer 122. The ground based data collection computer 123 is equipped with one or more storage elements that can include RAM, flash memory, a hard drive, or other types of electronic storage to store the digitized signals derived from the ground receiver coil assembly 10-2 and other input devices that are connected to computer 123. Computer 123 may also be configured to perform further data processing functions on the signals that it receives. The stationary sensor system 114 includes a Global Positioning System ("GPS") device 138 such that data obtained from the ground based receiver coil assembly 10-2 can be correlated with a GPS time signal and in some cases, a geographical location.

In an example embodiment, the data collected by airborne data collection computer 122 and the data collected by the ground based data collection computer 123 is ultimately transferred over respective communication links 130, 132 (which may be wired or wireless links or may include physical transfer of a memory medium such as laser discs or flash memory cards) to a data processing system such as a data processing computer 126 at which the electromagnetic field data obtained from the receiver coil assemblies 10-1 and 10-2 of sensor systems 112 and 114, data from altimeter system 136 and the GPS data from GPS sensors 138 associated with each of the air receiver coil assembly 10-1 and ground receiver coil assembly 10-24 can all be processed to determine if any anomalies exist that may be indicative of underground body of interest. In some example embodiments, some or all of the processing functions performed by data processing computer 126 may be performed at one or both of the airborne or ground based data collection computers 122 and 123.

In operation, the airborne sensor system 112 can be flown at a substantially constant speed in a series of parallel lines over a survey area to make a series of measurements of the audio frequency range magnetic field in three orthogonal vectors. Simultaneously, the stationary sensor system 114 is located on the ground within the survey region to also make a series of measurements of the magnetic field in three orthogonal vectors. The stationary sensor system 114 should, in at least some example uses, be placed a sufficient distance from any industrial electromagnetic field sources such as power lines so that natural audio-frequency magnetic fields dominate the signals received at the location of the stationary sensor system 114 and the residual industrial noise filtered in subsequent signal processing. For example, in one application the distance of the stationary sensor system 114 from a major power lines could be at least 3 Km. In example embodiments, there is no requirement for any special spatial orientation or attitude of the airborne or ground receiver coil assemblies 10-1, 10-2. For example, the X, Y and X axis of the airborne receiver coil assembly 10-1 do not need to be oriented in the same direction as the X, Y and Z axis of the ground based receiver coil assembly 10-2, and the orientation of the airborne assembly 10-1 can change during flight without adversely affecting the survey results.

Thus, as a survey of a region is conducted, the airborne data collection computer 122 receives and stores a stream of digitized data that is representative of the naturally occurring audio frequency magnetic field $H_{z(air)}(t)$ as measured by the airborne Z-axis sensor coil 16A, the naturally occurring audio frequency magnetic field $H_{x(air)}(t)$ as measured by the airborne X-axis sensor coil 16B and naturally occurring audio frequency magnetic field $H_{y(air)}(t)$ as measured by the airborne Y-axis sensor coil 16C. Each of the airborne magnetic field measurements is stamped with a GPS location and time information received from the GPS sensor 138, and with altitude information from the altimeter system 138. At the same time, the ground based data collection computer 123 receives and stores a stream of digitized data that is representative of the naturally occurring audio frequency magnetic field $H_{z(ground)}(t)$ as measured by the ground based Z-axis sensor coil 16A, the naturally occurring audio frequency magnetic field $H_{x(ground)}(t)$ as measured by the ground based X-axis sensor coil 16B and the naturally occurring audio frequency magnetic field $H_{y(ground)}(t)$ as measured by the ground based Y-axis sensor coil 16C. Each of the ground based magnetic field measurements is stamped at least with time information received from the GPS sensor 138, and in some embodiments also with location information. Thus, each of the airborne and stationary sensor systems 112, 114 respectively collect data records that each include three channels of data, each channel corresponding to the magnetic field measurement taken by a respective one of the sensor coils.

At the signal processing computer 126, the three channel data records from each of the airborne and stationary systems 112, 114 are merged in dependence on the GPS signal time data associated with each of the records to generate records that include six channels of digitized magnetic field data, with each record corresponding to measurements taken at substantially the same time at both the ground and airborne sensor systems.

In one example embodiment, frequency-domain processing is then performed on the data records either through applying narrow-band filters or applying Fast Fourier-transforms on multiple consecutive time blocks (by way of non limiting example, time blocks could each be 0.5-2 seconds long), resulting in a time series of data that represents the magnetic field measured by each of the respective sensor coils at specific audio frequencies. This data includes a real and imaginary number representation of the magnetic field components for each of the X, Y and Z axes as measured in the air and on the ground. Using this information, the strength of the magnetic field at a particular frequency as measured at each of the airborne and ground sensors can be determined and compared for different locations in the survey region. Certain frequencies can be filtered out—for example 60 Hz noise is removed in some embodiments.

By way of example, the strength of the magnetic field as measured at the airborne receiver coil assembly 10-1 at a particular frequency at a particular time can be represented as:

$$|H_{(air)}(f)| = \sqrt{(H_{z(air)}(f)^2 + H_{x(air)}(f)^2 + H_{y(air)}(f)^2)}$$

and the strength of the magnetic field as measured at the ground based receiver coil assembly 10-2 at the same frequency and time can be represented as $$|H_{(ground)}(f)| = \sqrt{(H_{z(ground)}(f)^2 + H_{x(ground)}(f)^2 + H_{y(ground)}(f)^2)}$$

The magnitudes of these vectors do not depend on the sensors' spatial attitudes, and by comparing the magnitudes of the vectors $|H_{(air)}(f)|$ $|H_{(ground)}(f)|$ at different points of the survey flight anomalies that are indicative of possible underground bodies of interest can be identified. By way of example, in the case of homogeneous terrain both the airborne and ground measured vector magnitudes will be substantially identical providing an airborne to ground ratio of equal or close to one. Deviation from this level can be treated as geophysical anomalies, with an airborne to ground ratio ($|H_{(air)}(f)|/|H_{(ground)}(f)|$) above one indicating a possible conductive underground (or scattering) body and below one indicating a less conductive body.

Although the above example has focused on comparing the magnitude or strength of the magnetic field vector $H_{(air)}(f)$ measured by airborne sensor assembly 13 relative to the strength of the magnetic field vector $H_{(ground)}(f)$ that is measured at a spatially separated sensor assembly 15, in some example embodiments other features of the magnetic field vectors $H_{(air)}(f)$ and $H_{(ground)}(f)$ can be compared to determine if anomalies that are suggestive of a conductive or scattering body can be detected. For example, in addition to changes in relative magnitude of the vectors, changes in the relative phases or orientation of the magnetic field vectors $H_{(air)}(f)$ and $H_{(ground)}(f)$ can provide anomalies that are suggestive of a conductive or scattering body. Accordingly, in example embodiments one or more of the relative magnitude, phase and orientation of the magnetic field vectors $H_{(air)}(f)$ and $H_{(ground)}(f)$ can be compared to determine if an anomaly indicative of a conductive or scattering body has been recorded.

In another example embodiment, the actual vector components are compared and the attitude-invariant properties of the relating tensors calculated. As soon as the electromagnetic wave is plane for any particular frequency, there is a coordinate system where the 3D magnetic complex vector {Mx, My, Mz} can be treated as a two 2D vectors, real and imaginary, for example Re(M)={Mu, Mv} having the third coordinate component equal to zero (except for the effects of noise). The new coordinate system can be found using known methods of vector-algebra by rotating the coordinate system and the resulting 2-D vectors then processed using adaptations of methods known for the processing of 2-D electric vectors. For example procedures for processing 2-D electric vectors are used in ground geophysics in magneto-telluric methods—sounding and profiling (see for example (1) Vozoff, K., 1972, The magnetotelluric method in the exploration of sedimentary basins: Geophysics, 37, 98-141. and (2) Anav, A., Cantarano, S., Cermli-Irelli, P., and Pallotino, G. V., 1976, A correlation method for measurement of variable magnetic fields: Inst. Elect. and Electron. Eng. Trans., Geosc. Elect., GE14, 106-1 14, which are hereby incorporated by reference). The procedures applied to electrical 2D vectors in these methods can be adapted and applied to the magnetic 2D vectors. One of the resulting parameters is a determinant of a matrix reflecting relations between the ground sensor system and in-flight sensor system derived magnetic vectors. This determinant is independent of the sensors' spatial attitude (invariant under rotation of the coordinate system) and it also reflects the relation between energies of total signals in the ground and airborne survey points. The determinant is also equal to one over homogeneous regions and deviates over any lateral conductivity changes.

Alternative Signal Processing Method

An alternative method for processing the signals received at the airborne and ground based sensors will now be described. According to another example embodiment, the airborne geophysical prospecting system 110 measures the magnetic field in several frequency bands at the base station sensor system 114 and at the airborne sensor system 112 and expresses the magnitude and phase of the magnetic fields as complex numbers. For example, these complex numbers could be the output of the frequency-domain processing referred to above. For each frequency band the system 110 estimates the 3×3 matrix which transforms the base station field into the airborne field. The estimates are calculated from the measured signals for each time interval of 0.4 to 1 s.

$$A = TB$$

where

A is a column 3-vector of complex numbers, the observed magnetic field at the airborne sensor system 112, in the airborne system frame of reference, B is a column 3-vector of complex numbers, the observed magnetic field at the base station sensor system 114, in a North-East-Down frame of reference, T is the 3×3 transfer function matrix.

Since the airborne system 112 attitude is arbitrary, the field observed there is rotated by an orthogonal matrix relative to the field that would be observed in a North-East-Down frame of reference.

$$A = RT_0 B$$

where R is a 3×3 real orthogonal matrix which transforms a vector from the North-East-Down frame of reference to the airborne system frame of reference, $T_0 = R^{-1} T$ is the 3×3 transfer function matrix in North-East-Down coordinates.

The objective is to define parameters of $T_0$ that can be calculated from the known T, without knowing R. That is, the derived parameters must be invariant under rotation or changes in attitude of the airborne sensor system 112.

To find conductive bodies, data is processed to identify locations where the source field (identified with B) is significantly amplified or attenuated. If there were just one component in B, the ratio of $|A|/|B|$ would be a rotation invariant parameter of that kind. Since there are three components of B, a vector $B_M$ which gives the greatest amplification can be identified.

The greatest possible amplification can be determined by singular value decomposition of T (See for example http://en.wikipedia.org/wiki/Singular_value_decomposition). A singular value decomposition is a set of matrices U, $T_S$, V, which meet these criteria:

$$T = U T_S V^*$$

where

U is a unitary matrix, i.e. $U^*U = UU^* = I$,
$T_S$ is a diagonal matrix with real non-negative values,
V is a unitary matrix, i.e. $V^*V = VV^* = I$,
* denotes the conjugate transpose.

(In the case of a non-square matrix, "diagonal" means that the only non-zero elements are those for which the row number and the column number are equal, just as in the case of a square matrix.)

The non-zero diagonal elements of $T_S$ are singular values. If they are placed in decreasing order of magnitude, then $T_S$ is unique. (However, U and V are not unique.)

Since $T_0 = R^{-1} T$, it follows that $$T_0 = U_0 T_S V^*$$

where $U_0 = R^{-1} U$ is also unitary matrix.

So, the singular values of T and $T_0$ are the same, hence they are invariant with respect to rotation of the airborne sensor system 112. (They are also invariant with respect to rotation of the base station sensor system 114.) The singular value with largest magnitude is the largest amplification factor. The squares of the non-zero singular values of T are the eigenvalues of $T^*T$. The singular value decomposition can be computed with standard publicly available software modules, e.g. function gsl_linalg_SV_decomp of the GNU Scientific Library, see http://www.gnu.org/software/gsl/. Since $B_z$ is (in MT theory) dependent on $B_x$ and $B_y$, the rank of T is at most 2 save for the effect of noise and errors, and so at least one of its diagonal elements should be negligibly different from zero.

Another option is to make T a 3×2 matrix, and compute the singular values accordingly. In the singular value decomposition, all the phase information is in U and V, which are not unique. The phase of the elements of U and V can in at least some situations be analyzed to get some meaningful information about the phase shift between the base station sensor system 114, and the airborne sensor system 112. U and V can be separated into a unitary matrix which is in some sense "zero phase", and a unitary matrix which is a diagonal matrix and contains the phase information.

$$U = U_0 U_P, \quad V = V_0 V_P$$

where $U_0$, $V_0$ are "zero phase" unitary matrices,
$U_P$, $V_P$ are diagonal unitary matrices.
Then $$T = U_0 U_P T_S V_P^* V_0^* = U_0 T_P V_0^*$$

where $T_P = U_P T_S V_P^*$ is a diagonal matrix which contains complex amplification factors, arranged in decreasing order of magnitude.

The phase of $U_0$ can be minimized by this procedure:

$$U_{Pij} = \left[\sum_{k=1\ldots 3} U_{kj}\right] / \left|\sum_{k=1\ldots 3} U_{kj}\right|, \text{ if } \sum_{k=1\ldots 3} U_{kj} \neq 0,$$

$$= 1, \text{ if } \sum_{k=1\ldots 3} U_{kj} = 0.$$

$$U_{0ij} = U_{ij} / U_{Pii}.$$

where $X_{ij}$ denotes the element of a matrix X at row i, column j.

That is, $U_0$ is obtained by multiplying each column of U by a unit magnitude phase factor so that the sum of each column of $U_0$ is non-negative real.

The identical procedure can be used to minimize the phase of $V_0$. Other procedures are also possible. The procedure described yields three rotation invariant parameters, the diagonal elements of $T_P$, which contain phase information and are related to the amplification of the primary field in the presence of subsurface geological structure.

A more concise set of parameters is desirable in at least some applications. As previously noted, the rank of T (and therefore of $T_P$) is at most 2 save for the effect of noise and errors. Since the elements of $T_P$ are in decreasing order of magnitude, the third diagonal element will be negligibly different from zero and can be discarded. To obtain a single rotation invariant parameter, the first and second parameters can be multiplied.

$$K = T_{P1} T_{P2}$$

where $T_{Pi}$ is a the i-th diagonal element of $T_P$.

In the absence of any subsurface features, the magnetic field is uniform everywhere. In that case, $T_{P1} = T_{P2} = 1$, and therefore K=1. Over a conductor, it is expected that the amplification parameters will have magnitude >1, thus $|K|>1$. While the detailed behaviour of the parameter K will be complicated, in simplified terms the presence of a conductor will be indicated by a positive anomaly on a profile or map of the parameter K.

A different (and perhaps simpler) algorithm can be used to obtain a related, though not identical, single rotation invariant parameter.

$$K = T_1 \times T_2.$$

$$K' = K \cdot Re(K) / |Re((K)|$$

where $T_i$ is the i-th column vector of the 3×3 transfer function matrix T.

The rotation invariance of this alternative parameter K' is evident since the equality $P = Q \times R$, the dot product $Q \cdot R$, and the length (modulus) $|Q|$ are preserved under any rotation of the basis of any vectors Q, R and their cross product P. The similarity to the parameter K is made evident by making the simplifying approximation that the unitary matrices $U_0$, $V_0$ are not "minimum phase" as defined above, but have no imaginary part and are therefore rotations or reflections. Since K' is invariant under rotations (and may reverse sign under reflections), it follows that it can be computed from $T_P$.

$$K = T_{P1} \times T_{P2} = [0, 0, T_{P1} T_{P2}]$$

$$K' = \pm T_{P1} T_{P2} = \pm K$$

where $T_{Pi}$ is a the i-th diagonal element of $T_P$.
With the simplifying assumption that $U_0$ and $V_0$ have no imaginary part, parameter K' is the product of the two non-zero amplification parameters, or its negative.

The parameters K and K' are example embodiments of the method of mapping subsurface structures, using natural sources and magnetic receivers, by calculating and displaying parameters that are independent of any rotation (including rotation about non-vertical axes) of a three axis airborne sensor system 112 and/or a two or three axis base sensor system 114.

It will thus be appreciated that in the low frequency magnetic field sensing embodiments discussed above, measurements can be made and used without regard to changes in attitude or rotation of the sensor systems. In this regard, the survey system is rotation invariant with respect to independent rotations of the airborne system 112 and/or the base station 114 about any axis, whether vertical or not.

In some applications of the geophysical prospecting system 110, the coils 16A, 16B and 16C can also be mounted using other types of support configurations—for example, rather than each coil being contained within its own tubular frame section that, the coils could be wound around coil formers located within a spherical protective shell (such as shown for example in above mentioned U.S. Pat. No. 6,876,202). Furthermore, the coils need not be air core coils—for example, they could be permeable core coils. In some embodiments, the sensors could be something other than coils. Alternatively, the airborne receiver coil assembly 10-1 and ground based coil assembly 10-2 could be implemented using 3D superconductive magnetic sensor (SQUID) technology or a low-noisy vector magnetometer.

Figure 13:
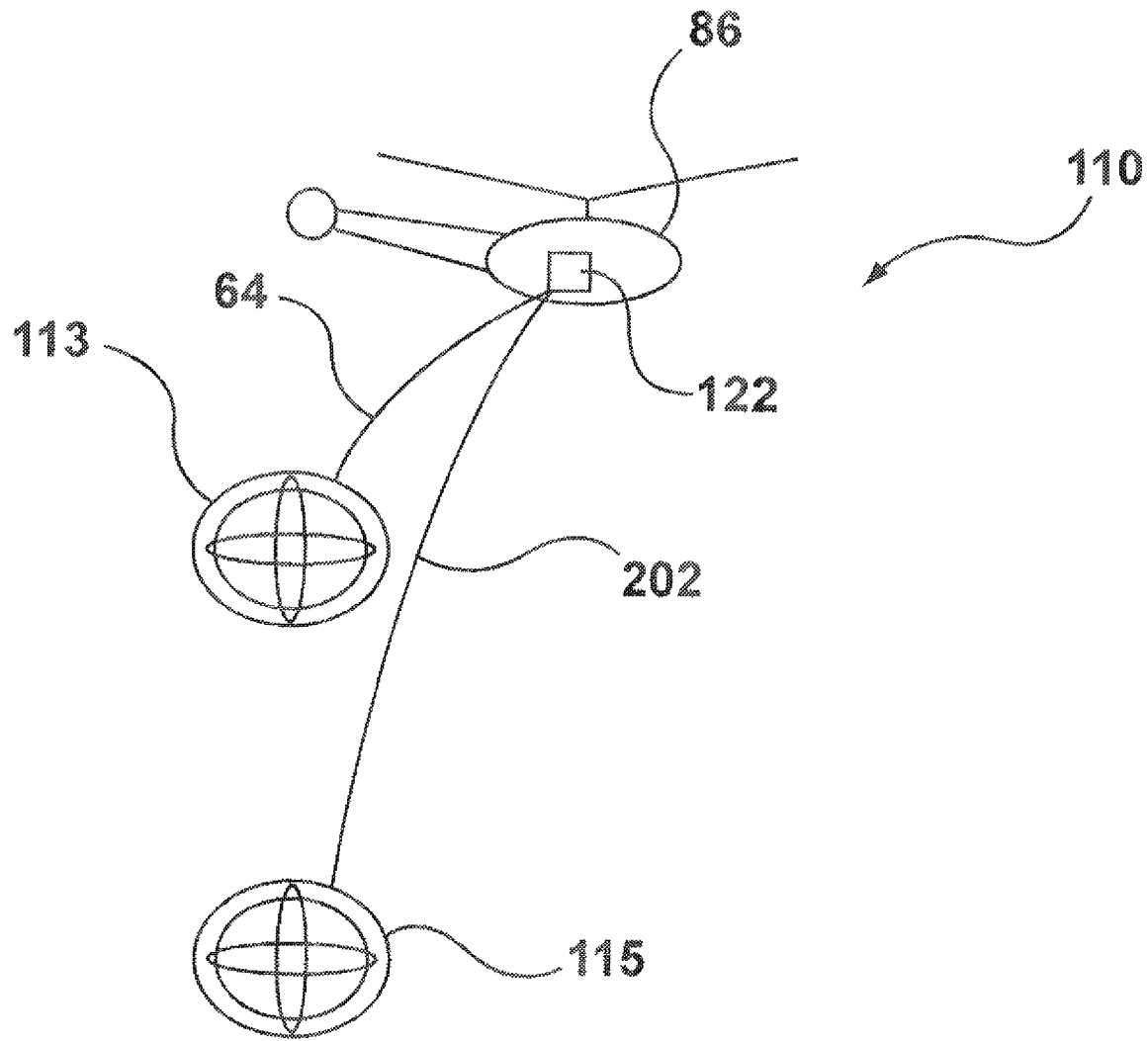
FIG. 13 shows a representation of a geophysical prospecting system according to another example embodiment of the invention.

FIG. 13 illustrates another example embodiment of an airborne geophysical prospecting system 200 that is similar in operation and configuration to system 110 except for differences that will be apparent from the Figures and the following description. In the system 200 of FIG. 3, the stationary sensor system 114 of system 110 is replaced with a second airborne sensor assembly 115 that is suspended from the same aircraft as the first airborne sensor assembly 113 by a respective tow cable 202 that is longer than the tow cable 64. Although suspended from the same aircraft 26 the first and second sensor assemblies 113 and 115 are spatially separated from each other with the second sensor assembly 115 being at a lower altitude. The functions of ground based data collection computer 123 and in at least some configurations data processing computer 126 are integrated into airborne computer 122. In case of a homogeneous terrain, both 3D sensor assemblies 113, 115 will receive the same AFMAG signal, but in presence of local underground conductors the secondary audiomagnetic field is stronger at the lower altitude because it is closer to the conductor. This difference can be detected by the same signal processing as in the first example excluding the signal records merging. All the signals are collected simultaneously by only one computer 122 and can be processed in the real time.

Tipper AFMAG

In some example embodiments, receiver coil assemblies 10-1 and 10-2 can alternatively be used in AFMAG-type geophysical prospecting systems that depend on tipper or tilt angle measurements as shown for example in above-mentioned U.S. Pat. No. 6,876,202. In such an application, attitude sensors can be located on the receiver coil assemblies 10-1 and 10-2 so that the orientation of such assemblies can be detected and the orientation information used in the calculation of tilt angle information that is derived from the signals collected from the receiver coil assemblies 10-1 and 10-2. For example, one or more accelerometers can be secured to the coil assemblies 10-1 and 10-2 to determine attitude information. Alternatively, three GPS receivers can be placed at spaced apart locations on the receiver coil assemblies 10-1 and 10-2 in order to track their respective attitudes In some example embodiments, both the tipper measurement methods described for example in U.S. Pat. No. 6,876,202 and the 3-D vector processing methods described above can be incorporated into single geophysical prospecting system 110, with the receiver coil assemblies 10-1 and 10-2 measuring the signals required for both types of calculations.

Time or Frequency Domain Electromagnetic

Figure 14:
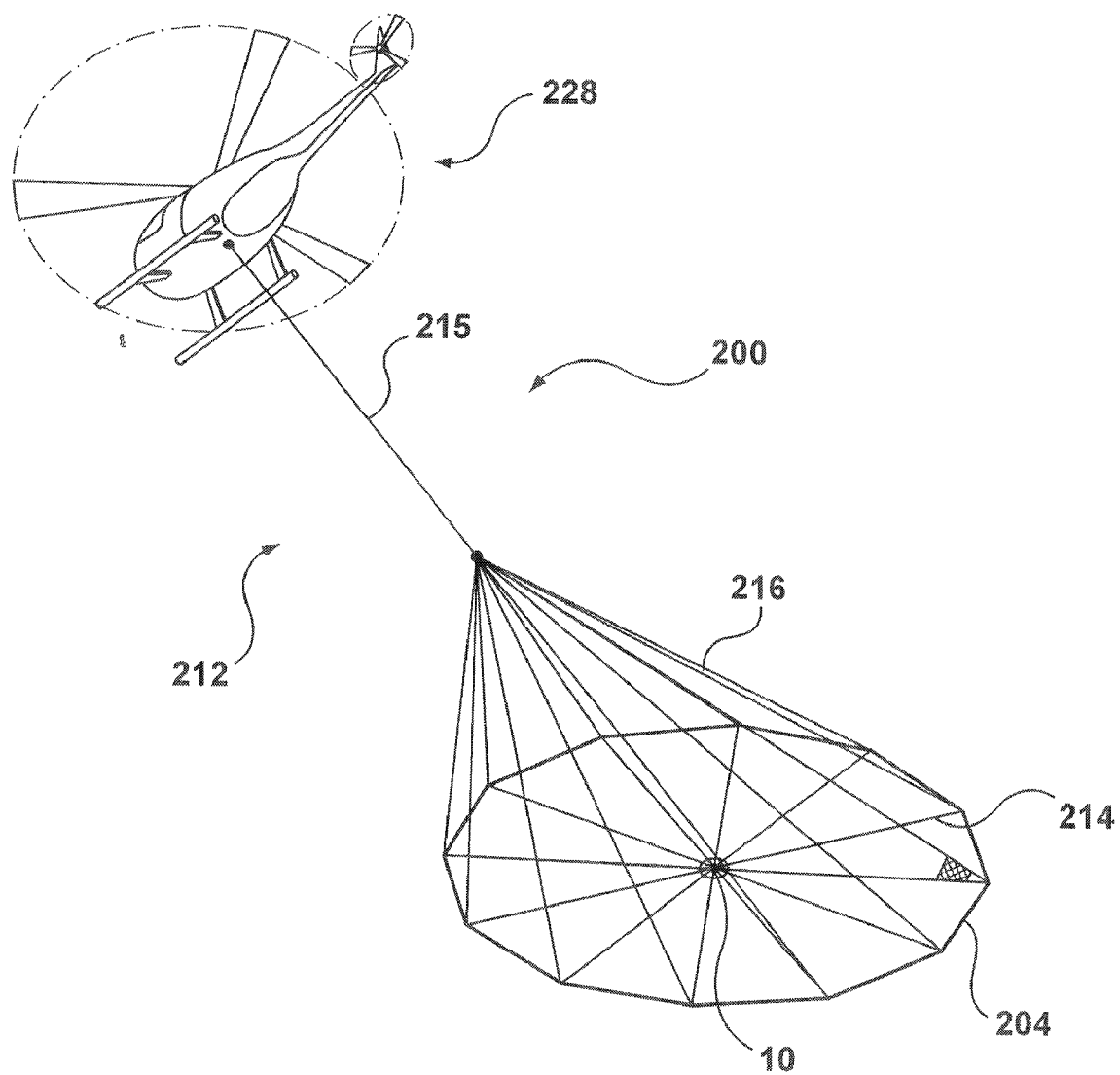
FIG. 14 shows a representation of a geophysical prospecting system according to another example embodiment of the invention.

The receiver coil assembly 10 could also be incorporated into active geophysical prospecting systems such as time domain electromagnetic (TDEM) geophysical survey systems or frequency domain electromagnetic systems (FDEM). By way of example the receiver coil assembly 10 could be integrated into a TDEM system such as shown in U.S. Pat. No. 7,157,914. FIG. 14 shows a schematic view of an airborne TDEM survey system 200 that includes a transmitter coil 204 and a receiver coil assembly 10 (having 3-orthogonal coils 16A, 16B and 16C). The TDEM survey system 200 can be carried by an aircraft 228 such as an airplane, helicopter, balloon or airship, for example. In at least some example embodiments, the transmitter coil 204 and receiver coil assembly 10 are part of a tow assembly 212 that is towed by the aircraft 228. In the example embodiment shown in FIG. 14, the transmitter coil 204 and the receiver coil assembly 10 are substantially concentric, with the transmitter coil 204 being mounted to a frame that is suspended from multiple support cables or ropes 216 that are each attached to a unique point on the circumference of the transmitter coil frame at one end and to a common tow cable 215 at the other end. The receiver coil assembly 10 is centrally supported by a series of radially extending cables or ropes 214 that extend to the transmitter coil frame. In one example embodiment, when in use the transmitter coil 204 is horizontally positioned with a substantially vertical dipole axis, and the receiver coil assembly 10 is located at a center of the transmitter coil 104, with the axis of the first receiver coil 16A being located in substantially vertical plane, the axis of the second receiver coil 16B being located in a substantially horizontal plane aligned in the direction of travel, and the axis of the second receiver coil 16B being located in a substantially horizontal plane aligned orthogonally to the direction of travel.

Measurements from the three receiver coils can be used to determine conductivity of bodies located in the survey region.

It will be appreciated by those skilled in the art that other variations of the embodiments described herein may also be practiced without departing from the scope of the invention. Other modifications are therefore possible.

What is claimed is:

1. A geophysical survey system comprising:
   a first sensor system including multiple magnetic field sensors for measuring magnetic field components of a low frequency magnetic field resulting from naturally occurring electromagnetic sources, the magnetic sensors of the first sensor system measuring magnetic field components representing three axes which are substantially perpendicular to each other;
   a second sensor system spaced apart from the first sensor system and including multiple magnetic field sensors for measuring magnetic field components of a low frequency magnetic field resulting from naturally occurring electromagnetic sources, the magnetic sensors of the second sensor system measuring magnetic field components representing two or three axes which are substantially perpendicular to each other; and
   a processing system for receiving information about the magnetic field components measured by the first sensor system and the second sensor system and in dependence thereon estimating transfer functions at a plurality of frequencies for transforming magnetic field components measured by the second sensor system to magnetic field components measured by the first sensor system, and computing parameters from the transfer functions that are independent of rotation of the first sensor system or the second sensor system about any axis thereof.

2. The geophysical survey system of claim 1 wherein the processing system estimates the transfer function at each frequency by determining elements of a 3×2 or 3×3 matrix T such that the element in the i-th row and j-th column of the matrix T is an estimate of the transfer function of the j-th magnetic field component measured by the second sensor system to the i-th magnetic field component measured by the first sensor system, and the processing system computes the parameters at each frequency by computing a singular value decomposition $U T_s V^*$ of the matrix T, wherein U and V are unitary matrices and $T_s$ is a diagonal matrix with real elements with the singular values being the diagonal elements of the diagonal matrix $T_s$, wherein the parameters are one or both of (i) the two largest singular values and (ii) the product of the two largest singular values.

3. The geophysical survey system of claim 2 wherein the processing system decomposes the unitary matrices U and V into diagonal unitary matrices $U_P$ and $V_P$ and unitary matrices $U_0$ and $V_0$; where $U_P$ and $V_P$ are selected to minimize the phase of the elements of $U_0$ and $V_0$; such that the singular value decomposition can be represented as $T=U_0 T_P V_0^*$ where $T_P = U_p T_s V_p^*$; the processing system identifying the diagonal elements of $T_P$ wherein the parameters further include the arguments (phase angles) of the two largest diagonal elements of $T_P$ or the argument (phase angle) of the product of the two largest diagonal elements of $T_P$ or both.

4. The geophysical survey system of claim 1 wherein the processing system estimates the transfer function at each frequency by determining elements of a 3×2 or 3×3 matrix T such that the element in the i-th row and j-th column of the matrix T is an estimate of the transfer function of the j-th magnetic field component measured by the second sensor system to the i-th magnetic field component measured by the first sensor system, and the processing system computes the parameters by determining the cross product $K=T_1 \times T_2$, where $T_i$ is the i-th column vector of the matrix T; and the parameters are the real and imaginary parts of the complex number $K'=K \cdot Re(K)/|Re(K)|$.

5. The geophysical survey system of claim 1 wherein the first sensor system includes a moving sensor system that is moved within a survey area, and the second sensor system includes a stationary sensor system.

6. The geophysical survey system of claim 5 wherein the moving sensor system is an airborne sensor system flown over the survey area, and the stationary sensor system is a ground based sensor system.

7. The geophysical survey system of claim 5 wherein the first sensor system comprises a receiver coil tow assembly for towing from an aircraft and which includes multiple receiver coils secured in a frame that maintains the receiver coils in a substantially constant position relative to each other.

8. The geophysical survey system of claim 7 wherein each receiver coil of the receiver coil tow assembly is housed within a respective tubular outer frame section that defines a continuous passageway in which the receiver coil extends, the tubular outer frame sections being connected together at spaced apart locations such that the frame has a skeletal configuration through which air can pass, and wherein each receiver coil is elastically suspended within the passageway of its respective tubular outer frame section.

9. The geophysical survey system of claim 1 wherein the first and second sensor systems are configured to measure magnetic field components in a plurality of different frequency bands falling substantially within 8 Hz to 400 Hz.

10. A method of geophysical surveying comprising:

measuring along multiple axes at multiple locations within a survey area magnetic field components of a low frequency magnetic field resulting from naturally occurring electromagnetic sources using a first sensor system;

measuring along multiple axes magnetic field components of a low frequency magnetic field resulting from naturally occurring electromagnetic sources using a second sensor system; and receiving information about the magnetic field components measured by the first sensor system and the second sensor system and in dependence thereon computing parameters from the received information that are independent of rotation of the first sensor system or the second sensor system about any axis thereof, wherein computing parameters comprises estimating transfer functions at a plurality of frequencies for transforming magnetic field components measured by the second sensor system to magnetic field components measured by the first sensor system, the parameters being computed from the transfer functions.

11. The method of claim 10 wherein the parameters include a first magnetic field magnitude as represented by the magnetic field components measured at the first sensor system and a second magnetic field magnitude as represented by the magnetic field components measured at the second sensor system.

12. The method of claim 10 wherein estimating the transfer function at each frequency includes determining elements of a 3×2 or 3×3 matrix T such that the element in the i-th row and j-th column of the matrix T is an estimate of the transfer function of the j-th magnetic field component measured by the second sensor system to the i-th magnetic field component measured by the first sensor system, and computing the parameters includes computing a singular value decomposition $U T_s V^*$ of the matrix T, wherein U and V are unitary matrices and $T_s$ is a diagonal matrix with real elements with the singular values being the diagonal elements of the diagonal matrix $T_s$, wherein the parameters are one or both of the two largest singular values and the product of the two largest singular values.

13. The method of claim 12 comprising decomposing the unitary matrices U and V of into diagonal unitary matrices $U_P$ and $V_P$ and unitary matrices $U_0$ and $V_0$; where $U_P$ and $V_P$ are selected to minimize the phase of the elements of $U_0$ and $V_0$; such that the single value decomposition can be represented as $T=U_0 T_P V_0^*$ where $T_P = U_p T_s V_p^*$; and identifying the diagonal elements of $T_P$ wherein the parameters further include the arguments (phase angles) of the two largest diagonal elements of $T_P$ or the argument (phase angle) of the product of the two largest diagonal elements of $T_P$ or both.

14. The method of claim 10 wherein estimating the transfer function at each frequency includes determining elements of a 3×2 or 3×3 matrix T such that the element in the i-th row and j-th column of the matrix T is an estimate of the transfer function of the j-th magnetic field component measured by the second sensor system to the i-th magnetic field component measured by the first sensor system, and computing the parameters includes calculating the cross product $K=T_1 \times T_2$, where $T_i$ is the i-th column vector of the matrix T;

and the parameters are the real and imaginary parts of the complex number $K'=K \cdot Re(K)/|Re(K)|$.

15. The method of claim 10 comprising towing the first sensor system from an aircraft over the survey area while maintaining the second sensor system in a stationary location while measuring using the first sensor system and measuring using the second sensor system.

* * * * *